United States Patent
Soeda et al.

(10) Patent No.: US 12,314,329 B2
(45) Date of Patent: May 27, 2025

(54) METHOD, SERVER, AND RECORDING MEDIUM

(71) Applicant: Panasonic Intellectual Property Corporation of America, Torrance, CA (US)

(72) Inventors: Junichiro Soeda, Nara (JP); Kakuya Yamamoto, Hyogo (JP); Motoji Ohmori, Osaka (JP); Junji Michiyama, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/521,060

(22) Filed: Nov. 28, 2023

(65) Prior Publication Data

US 2024/0095287 A1 Mar. 21, 2024

Related U.S. Application Data

(63) Continuation of application No. PCT/JP2022/022218, filed on May 31, 2022.

(60) Provisional application No. 63/196,348, filed on Jun. 3, 2021.

(51) Int. Cl.
*G06F 16/95* (2019.01)
(52) U.S. Cl.
CPC .................... *G06F 16/95* (2019.01)
(58) Field of Classification Search
CPC .................................................. G06F 16/95
See application file for complete search history.

(56) References Cited

U.S. PATENT DOCUMENTS

| 2015/0347683 A1* | 12/2015 | Ansari | G16H 10/60 726/7 |
| 2017/0344703 A1* | 11/2017 | Ansari | H04L 67/55 |
| 2022/0321649 A1* | 10/2022 | Unagami | H04L 67/1091 |

FOREIGN PATENT DOCUMENTS

JP 2019-79577 5/2019

OTHER PUBLICATIONS

International Search Report (ISR) issued on Sep. 6, 2022 in International (PCT) Application No. PCT/JP2022/022218.

* cited by examiner

*Primary Examiner* — Merilyn P Nguyen
(74) *Attorney, Agent, or Firm* — Wenderoth, Lind & Ponack, L.L.P.

(57) ABSTRACT

A method includes: associating one or more data managers with mutually different models of a plurality of home appliances the one or more data managers managing data items generated by the plurality of home appliances; recording provision record information in which data identification information and manager identification information are associated with each other, the data identification information identifying each of one or more data items generated by the plurality of home appliances, the manager identification information identifying each of the one or more data managers; and determining, when the one or more data items include a used data item used by a data user, an amount to be transferred to a data manager that manages the used data item, based on the provision record information.

10 Claims, 21 Drawing Sheets

FIG. 3

| Household ID | Home appliance model ID | Individual number | Operation time | Operation detail |
|---|---|---|---|---|
| JP10-200153 | Pa-TV-19-42-VX1 | 19-08-10-02224 | 2020-10-08-05:25:15 | Power on |
| JP10-200153 | Pa-TV-19-42-VX1 | 19-08-10-02224 | 2020-10-08-05:25:18 | Change channels: 1 ch |
| JP10-200153 | Hi-RF-17-500-S2 | 17-10-03-28341 | 2020-10-08-05:26:10 | First door: open and close |
| JP10-200153 | Ri-ES-18-201 | 18-02-07-00113 | 2020-10-08-05:26:40 | Second burner: on |
| JP10-200153 | Ri-ES-18-201 | 18-02-07-00113 | 2020-10-08-05:26:41 | Second burner: set to medium heat |
| ... | ... | ... | ... | ... |

FIG. 4

| Home appliance model ID | Manager registration ID |
|---|---|
| ... | ... |
| Hi-RF-17-500-S2 | 02-003 |
| ... | ... |
| So-VR-17-BR200 | 08-002 |
| ... | ... |
| Pa-MW-19-BS901 | 10-010 |
| ... | ... |
| Pa-WM-13-60-SP1 | 10-013 |
| ... | ... |
| Pa-TV-19-42-VX1 | 10-221 |
| ... | ... |
| Pa-VR-19-VX800 | 10-343 |
| ... | ... |
| DK-AC-16-EX402 | 15-002 |
| ... | ... |
| Ri-ES-18-201 | 23-446 |
| ... | ... |
| Hr-WM-18-80-DR3 | 81-002 |
| ... | ... |

FIG. 5

| Home appliance usage history ID | Household ID | Manager registration ID | Home appliance model ID | Individual number | Operation time | Operation detail | Value reference information | | |
|---|---|---|---|---|---|---|---|---|---|
| | | | | | | | Degree of privacy involvement | Penetration rate | Season/time variability |
| 20201008-0527-00013 | JP10-200153 | 10-221 | Pa-TV-19-42-VX1 | 19-08-10-02224 | 2020-10-08-05:25:15 | Power on | 0 | 0 | 1 |
| 20201008-0527-00014 | JP10-200153 | 10-221 | Pa-TV-19-42-VX1 | 19-08-10-02224 | 2020-10-08-05:25:18 | Change channels: 1 ch | 3 | 0 | 1 |
| 20201008-0527-00015 | JP10-200153 | 02-003 | Hi-RF-17-500-S2 | 17-10-03-28341 | 2020-10-08-05:26:10 | First door: open and close | 0 | 0 | 1 |
| 20201008-0527-00017 | JP10-200153 | 23-446 | Ri-ES-18-201 | 18-02-07-00113 | 2020-10-08-05:26:40 | Second burner: on | 0 | 1 | 1 |
| 20201008-0527-00018 | JP10-200153 | 23-446 | Ri-ES-18-201 | 18-02-07-00113 | 2020-10-08-05:26:41 | Second burner: set to medium heat | 1 | 1 | 1 |
| ... | ... | ... | ... | ... | ... | ... | ... | ... | ... |
| 20201008-0837-02184 | JP10-200153 | 02-003 | Hi-RF-17-500-S2 | 17-10-03-28341 | 2020-10-08-08:36:27 | Second door: open and close | 0 | 0 | 0 |
| | | | | | | | ... | ... | ... |

FIG. 6

| Applied time period | Manager registration ID | Home appliance model ID | Individual number | Provided information amount |
|---|---|---|---|---|
| October 8, 2020 0:00:00 to October 8, 2020 23:59:59 | 10-221 | Pa-TV-19-42-VX1 | 19-08-10-02224 | 135 |
| | 02-003 | Hi-RF-17-500-S2 | 17-10-03-28341 | 87 |
| | 23-446 | Ri-ES-18-201 | 18-02-07-00113 | 23 |
| | 15-002 | DK-AC-16-EX402 | 16-11-03-04675 | 18 |
| | 10-010 | Pa-MW-19-BS901 | 19-02-01-00012 | 9 |
| ... | ... | ... | ... | ... |

FIG. 7

| User ID | Home appliance usage history ID | Manager registration ID | Home appliance model ID |
|---|---|---|---|
| A2356 | 20200101-0420-00011 | 10-013 | Pa-WM-13-60-SP1 |
| A2356 | 20200101-0420-00147 | 81-002 | Hr-WM-18-80-DR3 |
| ⋮ | ⋮ | ⋮ | ⋮ |
| A2356 | 20200101-0420-00012 | 10-013 | Pa-WM-13-60-SP1 |
| A2356 | 20200101-0420-00148 | 81-002 | Hr-WM-18-80-DR3 |
| ⋮ | ⋮ | ⋮ | ⋮ |
| A2356 | 20201103-2359-13487 | 10-343 | Pa-VR-19-VX800 |
| A2356 | 20201103-2359-13501 | 08-002 | So-VR-17-BR200 |
| ⋮ | ⋮ | ⋮ | ⋮ |

FIG. 8

| Target home appliance model ID | Current manager registration ID | Successor manager registration ID |
|---|---|---|
| Pa-MW-14-BS803 | 10-010 | 10-099 |
| Pa-MW-15-BS701 | 10-010 | 10-099 |
| ... | ... | ... |
| Pa-MW-19-BS901 | 10-010 | 10-213 |
| ... | ... | ... |

FIG. 12

| User ID | Application time | Use application detail |
|---|---|---|
| A2356 | November 7, 2020, 10:39 | Survey of reservation times of washing machines in fiscal year 2020 |
| A2356 | November 7, 2020, 10:40 | Information of detergents used in and after August, fiscal year 2020 |
| A2356 | November 7, 2020, 10:50 | Recording states on November 3, 2020, 11 p.m. |
| ... | ... | ... |

METHOD, SERVER, AND RECORDING MEDIUM

CROSS REFERENCE TO RELATED APPLICATIONS

This is a continuation application of PCT International Application No. PCT/JP2022/022218 filed on May 31, 2022, designating the United States of America, which is based on and claims priority of U.S. Provisional Patent Application No. 63/196,348 filed on Jun. 3, 2021. The entire disclosures of the above-identified applications, including the specifications, drawings and claims are incorporated herein by reference in their entirety.

FIELD

The present disclosure relates to a method, a server, and a recording medium.

BACKGROUND

PTL 1 discloses a technique in which information (data) items from IoT devices are gathered by a distributed file sharing technique for sharing information of electronic files such as HTML, PDF, and text and autonomously rendered into a WEB service and shared on a distributed file sharing network formed by IoT gateways.

CITATION LIST

Patent Literature

PTL 1: Japanese Unexamined Patent Application Publication No. 2019-79577

SUMMARY

Technical Problem

However, in the method disclosed in PTL 1, it is difficult to appropriately distribute a benefit made by the use of data among data managers because an amount to be transferred to a data manager that differs by the model of home appliance is not considered.

An object of the present disclosure, which has been made in view of the circumstances mentioned above, is to provide a method, a server, and a program that can appropriately distribute a benefit made by the use of data, among the data managers.

Solution to Problem

A method according to one aspect of the present disclosure comprising: associating one or more data managers with mutually different models of a plurality of home appliances, the one or more data managers managing data items generated by the plurality of home appliances; recording provision record information in which data identification information and manager identification information are associated with each other, the data identification information identifying each of one or more data items generated by the plurality of home appliances, the manager identification information identifying each of the one or more data managers; and determining, when the one or more data items include a used data item used by a data user, an amount to be transferred to a data manager that manages the used data item, based on the provision record information.

A server according to one aspect of the present disclosure comprising: a processor; and memory, wherein one or more data managers are different for each of models of a plurality of home appliances, the one or more data managers managing data items generated by the plurality of home appliances, using the memory, the processor: records provision record information in which data identification information and manager identification information are associated with each other, the data identification information identifying each of one or more data items generated by the plurality of home appliances, the manager identification information identifying each of the one or more data managers; and determines, when the one or more data items include a used data item used by a data user, an amount to be transferred to a data manager that manages the used data item, based on the provision record information.

It should be noted that these general or specific aspects may be implemented using a system, a method, an integrated circuit, a computer program, a computer-readable recording medium such as a CD-ROM, or any combination of systems, methods, integrated circuits, computer programs, or computer-readable recording media.

Advantageous Effects

By the method and the like according to the present disclosure, a benefit made by the use of data can be appropriately distributed among the data managers.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a diagram illustrating an example of a data format of operation logs that are sent from connection devices according to Embodiment 1.

FIG. 4 is a diagram illustrating an example of a manager registration look-up table according to Embodiment 1.

FIG. 5 is a diagram illustrating an example of a data format of operation logs that are recorded on a usage history DB according to Embodiment 1.

FIG. 6 is a diagram illustrating an example of a data format of provision record information items that are recorded on a provision record DB according to Embodiment 1.

FIG. 7 is a diagram illustrating an example of a data format of use record information items that are recorded on a use record DB according to Embodiment 1.

FIG. 8 is a diagram illustrating an example of a data format of a change request according to Embodiment 1.

FIG. 12 is a diagram illustrating an example of a data format of a use request according to Embodiment 1.

DESCRIPTION OF EMBODIMENTS

Figure 1:
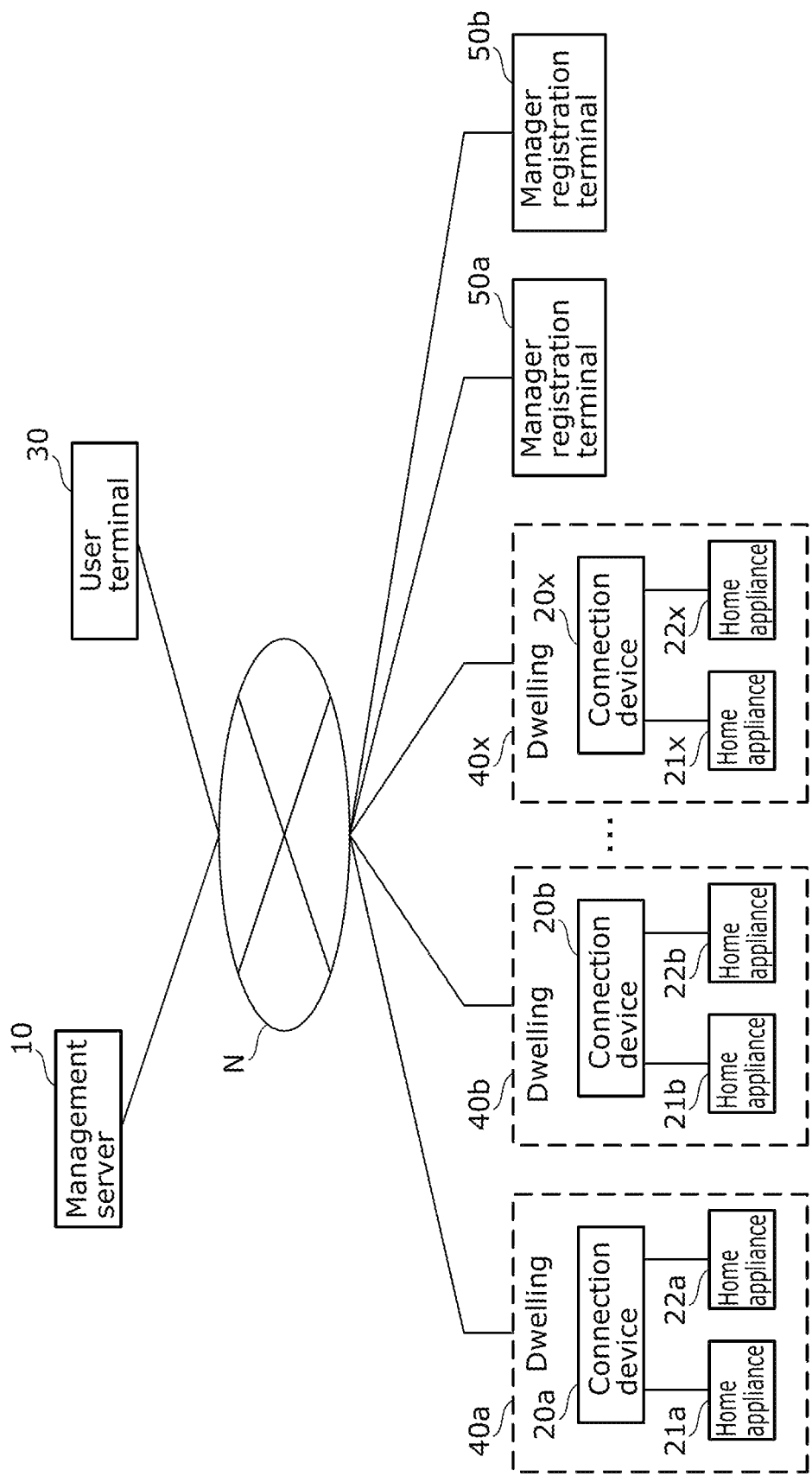
FIG. 1 is a diagram illustrating an example of a configuration of a management system according to Embodiment 1.

A method includes: associating one or more data managers with mutually different models of a plurality of home appliances, the one or more data managers managing data items generated by the plurality of home appliances; recording provision record information in which data identification information and manager identification information are associated with each other, the data identification information identifying each of one or more data items generated by the plurality of home appliances, the manager identification information identifying each of the one or more data managers; and determining, when the one or more data items include a used data item used by a data user, an amount to be transferred to a data manager that manages the used data item, based on the provision record information.

Accordingly, amounts (incentives) can be determined for different data managers of different models, based on the manager identification information having a high flexibility in changing. Therefore, a benefit (profit) made by the use of data can be appropriately and efficiently distributed among the data managers. A profit is an example of a benefit. On the other hand, when recipients of incentives are not yet set at the stage of determining incentives, a process for setting the recipients occurs. In the incentive determination method according to the one aspect of the present disclosure, since the manager identification information that indicates recipients of incentives is already set at the stage of determining incentives, it is possible to omit the process for setting the recipients. This makes it possible to reduce throughput of a processor and thus reduce the consumed power of a system.

The one or more data items may be provided by one or more data providers having the plurality of home appliances, and the one or more data managers and the one or more data providers may be mutually different.

Therefore, an incentive for a data manager different from a data provider can be determined.

A first data provider among the one or more data providers may have a first home appliance of a first model and a second home appliance of a second model different from the first model, a second data provider among the one or more data providers may have a third home appliance of the first model and a fourth home appliance of the second model, a first data manager among the one or more data managers may manage data items provided by the first home appliance and the third home appliance, and a second data manager among the one or more data may manager manages data items provided by the second home appliance and the fourth home appliance.

Accordingly, a profit obtained by the use of data generated by a home appliance of the first model can be determined as an incentive for the first data manager, and a profit obtained by the use of data generated by a home appliance of the second model can be determined as an incentive for the second data manager. Therefore, a profit made by the use of data can be appropriately distributed among the data managers.

The method may further include: receiving a change request to change specific manager identification information associated with specific data identification information in the provision record information, the specific data identification information identifying a specific data item generated by a specific home appliance; and changing the specific manager identification information associated with the specific data item, based on the change request.

Accordingly, the specific manager identification information associated with the specific data identification information item can be easily changed. Therefore, a recipient of an incentive can be easily changed.

The change request may be a request to change first manager identification information to second manager identification information different from the first manager identification information, the first manager identification information being associated with first data identification information that identifies each of one or more first data items generated by a first home appliance, in the changing, the first manager identification information associated with the first data identification information may be changed to the second manager identification information, based on the change request, the first manager identification information may be identification information that identifies a first data manager among the one or more data managers, and the second manager identification information may be identification information that identifies a second data manager among the one or more data managers, the second data manager being different from the first data manager.

Accordingly, manager identification information associated with the first data identification information can be easily changed from the first manager identification information to the second manager identification information. Therefore, a recipient of an incentive can be easily changed.

The determining of the amount to be transferred to the data manager may include: identifying a data item associated with data identification information, based on the provision record information, the data identification information being identical to data identification information that identifies the used data item, and identifying a data manager that manages the data item identified; and determining an amount to be transferred to the data manger identified, based on value reference information of the data item identified.

Accordingly, based on used data being data generated by a home appliance and having such a use record that the data has been used, a data manager that manages the use record can be easily identified. Therefore, a recipient of a profit made by the use of data can be appropriately determined.

The method may further include: recording the provision record information on a provision record database; and recording use record information on a use record database, the use record information including the data identification information that identifies the used data item, wherein in the recording of the provision record information, the computer transmits a first transaction data item that includes the provision record information to an other computer, and stores a first block that includes the first transaction data item into a distributed ledger held by the computer, and in the recording of the use record information, the computer transmits a second transaction data item that includes the use record information to the other computer, and stores a second block that includes the second transaction data item into the distributed ledger.

Accordingly, the provision record information and the use record information can be stored into the distributed ledger. Thus, an incentive for a data manager can be determined using the provision record information and the use record information that are difficult to falsify. Therefore, an incentive for a data manager can be determined more appropriately.

Each of a plurality of distributed ledgers held by the computer and the other computer may include a contract code for executing the identifying of the data manager and the determining of the amount to be transferred to the data manager identified, based on the second transaction data item, the plurality of distributed ledgers including the distributed ledger held by the computer, and the identifying of the data manager and the determining of the amount to be transferred to the data manager identified may be executed by obtaining the second transaction data item and executing the contract code included in the distributed ledger held by the computer.

Accordingly, the identifying of the data manager and the determining of the amount to be transferred to the data manager identified are executed by executing the contract code. Thus, an incentive for a data manager can be automatically determined using the provision record information and the use record information that are difficult to falsify.

The provision record information may further include a hash value of the data item.

Accordingly, provision record information stored in a distributed ledger includes a hash value instead of data. Thus, the data can be made not open to the public.

A server according to one aspect of the present disclosure includes: a processor; and memory, wherein one or more data managers are different for each of models of a plurality of home appliances, the one or more data managers managing data items generated by the plurality of home appliances, using the memory, the processor: records provision record information in which data identification information and manager identification information are associated with each other, the data identification information identifying each of one or more data items generated by the plurality of home appliances, the manager identification information identifying each of the one or more data managers; and determines, when the one or more data items include a used data item used by a data user, an amount to be transferred to a data manager that manages the used data item, based on the provision record information.

Accordingly, amounts (incentives) can be determined for different data managers of different models, based on the manager identification information having a high flexibility in changing. Therefore, a profit made by the use of data can be appropriately distributed among the data managers.

It should be noted that these general or specific aspects may be implemented using a system, a method, an integrated circuit, a computer program, a computer-readable recording medium such as a CD-ROM, or any combination of systems, methods, integrated circuits, computer programs, or computer-readable recording media.

Hereinafter, embodiments are described with reference to the drawings. It should be noted that each of the embodiments described below shows a specific example of the present disclosure. In other words, the numerical values, shapes, materials, constituent elements, the arrangement and connection of the constituent elements, steps, the processing order of the steps, etc. described in the following embodiments are mere example, and are not thus intended to limit the scope of the present disclosure. Among the constituent elements in the following embodiments, those not recited in any of the independent claims representing the most generic concepts are not necessarily essential to achieving the object of the present disclosure, and are described as constituent elements included in an exemplary embodiment.

Embodiment 1

First, a system configuration according to the present disclosure will be described.

Hereinafter, a configuration and the like of a management system according to the present embodiment will be described with reference to the drawings.

[Management System]

FIG. 1 is a diagram illustrating an example of a configuration of a management system according to Embodiment 1.

As illustrated in FIG. 1, the management system according to the present embodiment includes, for example, management server 10, connection devices 20a to 20x, home appliances 21a to 21x and 22a to 22x, user terminal 30, and manager registration terminals 50a and 50b. These are connected together by network N. Examples of network N include the Internet, a carrier network for mobile phones, and the like. Network N may be constituted by any communication line or network. One of connection devices 20a to 20x and two of home appliances 21a to 21x and 22a to 22x are associated with one of dwellings 40a to 40x. For example, connection device 20a and home appliances 21a and 22a are associated with dwelling 40a of user A. Note that dwellings 40a to 40x are each not limited to a dwelling and may be a facility such as a factory, an office, and a warehouse. Although it is assumed that one dwelling is associated with two home appliances, this is not limiting. One dwelling only has to be associated with one or more home appliances.

Hereinafter, connection device 20a to connection device 20x will be each also referred to as connection device 20 and connection device 20a to connection device 20x may be also referred to as connection device A to connection device X.

Likewise, home appliance 21a to home appliance 21x will be each also referred to as home appliance 21, and home appliance 22a to home appliance 22x will be each also referred to as home appliance 22. Home appliance 21a to home appliance 21x may be also referred to as home appliance A1 to home appliance X1, and home appliance 22a to home appliance 22x may be also referred to as home appliance A2 to home appliance X2. Likewise, dwelling 40a to dwelling 40x will be each also referred to as dwelling 40, and dwelling 40a to dwelling 40x may be also referred to as dwelling A to dwelling X. Likewise, manager registration terminals 50a and 50b will be each also referred to as manager registration terminal 50, and manager registration terminals 50a and 50b may be also referred to as manager registration terminal A and manager registration terminal B, respectively.

Management server 10 will be described below.

[Management Server 10]

Management server 10 is an example of an apparatus that gathers operation logs of home appliances 21a to 21x and 22a to 22x placed in dwellings 40a to 40x and provides analysis data generated based on the gathered operation logs to a data user. Here, the operation logs are an example of data. Management server 10 determines an incentive to be given to a data manager who is a manager of an operation log used by a data user. A plurality of data managers are associated with mutually different models of home appliances 21a to 21x. The incentive is determined in accordance with a use record of an operation log that is provided by a home appliance of a model with which a data manager is associated. Management server 10 then may pay the determined incentive to the data manager. Management server 10 may also calculate a usage charge of an operation log used by a data user and collect the calculated usage charge from the data user. For example, an incentive may be paid to a data manager from a usage charge collected from a data user. An incentive or a profit is an example of an amount. Note that a data user may be also referred to as a user. Likewise, a data manager may be also referred to as a manager. Likewise, a data provider may be also referred to as a provider.

Figure 2:
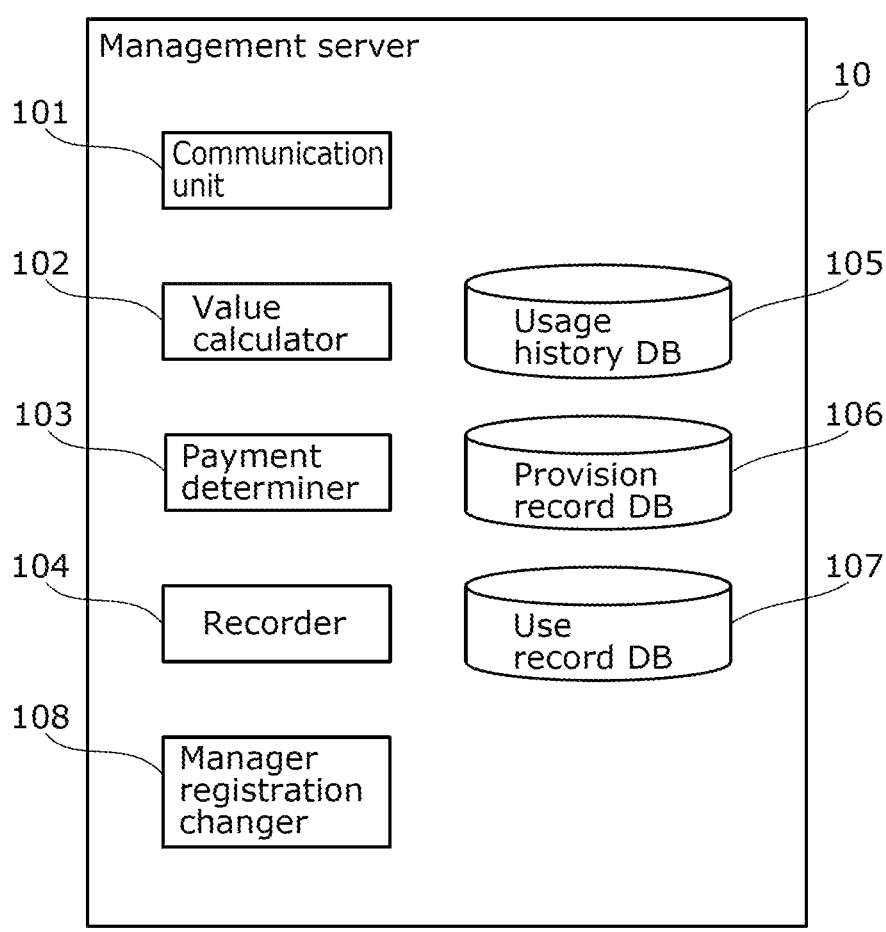
FIG. 2 is a diagram illustrating an example of a configuration of a management server according to Embodiment 1.

FIG. 2 is a diagram illustrating an example of a configuration of a management server according to Embodiment 1.

As illustrated in FIG. 2, management server 10 includes communication unit 101, value calculator 102, payment determiner 103, recorder 104, usage history database (DB) 105, provision record database (DB) 106, use record database (DB) 107, and manager registration changer 108. Management server 10 can be implemented by a processor executing a specified program using a memory. Management server 10 is an example of a computer. The constituent components will be described below.

Communication unit 101 communicates with a plurality of connection devices 20 via network N. Communication unit 101 receives, from each of the plurality of connection devices 20, operation logs of home appliances 21 and 22 connected to that connection device 20. That is, communication unit 101 receives operation logs of home appliances 21a to 21x and 22a to 22x from the plurality of connection devices 20a to 20x. The operation logs will be described in detail.

Communication unit 101 also communicates with user terminal 30 via network N. Communication unit 101 receives a use request to use an operation log from user terminal 30. Communication unit 101 sends, to user terminal 30, the operation log in response to the received use request or analysis data that is generated based on the operation log. The analysis data will be described later in detail.

Communication unit 101 also communicates with manager registration terminal 50 via network N. Communication unit 101 receives a change request to change a manager identification information (manager registration ID) from manager registration terminal 50. The change request will be described later in detail.

Note that the communication by communication unit 101 may be performed on transport layer security (TLS), and an encryption key for the TLS communication may be retained in communication unit 101.

Value calculator 102 adds, to each of a plurality of gathered operation logs, value reference information based on the operation log. The value reference information is information that serves as a reference for computing a data value of an operation log. The value reference information includes an index value that is determined for each of a plurality of value indices. Specifically, the plurality of value indices in the value reference information may include at least two of a first value index based on an operation log type, a second value index based on a type of a home appliance that generates an operation log, and a third value index based on a period at which an operation log is generated by a home appliance. In the present embodiment, higher index values of the first value index, the second value index, and the third value index indicate higher values. Note that the higher index values need not indicate higher values and may indicate lower values. Note that value calculator 102 need not calculate a value of an operation log based on the value reference information. Specifically, value calculator 102 may calculate the same value (a common value), that is, a fixed value for each operation log.

The first value index based on an operation log type is an index that represents a degree of involvement of the operation log with privacy of an individual who is associated in advance with the operation log type. The degree of involvement of an operation log with privacy of an individual indicates that, for example, the larger an index value of the degree, the higher the operation log has a degree of being private rather than public. For example, the first value index may be indicated with an index value in four levels including "3: greatly high," "2: high," "1: rather high," and "0: no involvement." Index values of the first value index may be associated in advance with, in a table, operation log types. The table may be further categorized according to types of home appliances.

For example, in the case where a home appliance is a scale, and where an operation log includes a result of measurement of a body weight, an index value of a first value index of the operation log may be set to "3." For example, in the case where a home appliance is a television, and an operation log includes viewing data, an index value of a first value index of the operation log may be set to "2." The viewing data includes a viewed channel, a time period of view (a start time point of view, an end time point of view), and the like. For example, in the case where a home appliance is a microwave oven, and an operation log includes an operation of the microwave oven, an index value of a first value index of the operation log may be set to "1." For example, in the case where a home appliance is an air conditioner, and an operation log includes a temperature setting of the air conditioner, an index value of a first value index of the operation log may be set to "0." For example, in the case where a home appliance is an illuminating device, and an operation log includes power-on of the illuminating device, an index value of a first value index of the operation log may be set to "0."

The second value index based on a type of a home appliance generating an operation log is an index that represents a penetration rate of the type of the home appliance. The penetration rate indicates, for example, that the larger an index value of the penetration rate is, the larger a proportion of dwellings in which a home appliance of the type is placed, to all dwellings. For example, the second value index may be indicated with an index value in three levels including "2: small," "1: medium," and "0: large." Index values of the second value index may be associated in advance with, in a table, types of home appliances generating operation logs. Note that a type of home appliances may be a set of home appliances that are categorized by home appliance having a common function, may be a set of home appliances that are categorized by model, or may be a set of home appliances that are categorized by manufacturer.

For example, in the case where a home appliance is a television, an index value of a second value index of an operation log generated by the home appliance may be set to "0." For example, in the case where a home appliance is an air cleaner, an index value of a second value index of an operation log generated by the home appliance may be set to "1." For example, in the case where a home appliance is a roaster, an index value of a second value index of an operation log generated by the home appliance may be set to "2."

The third value index based on a period at which an operation log is generated by a home appliance is an index that represents a variability in season or time in or at which the operation log is generated. The variability in season or time is a degree that increases with an increase in steepness of a variation in season, weather, or the like occurring. For example, the variability increases with a decrease in frequency of an event held when an operation log is generated. For example, an event having a low frequency may be an event that is held at such a rate as once every multiple years, such as Olympics, FIFA World Cup, and a world's fair, or may be an event that is held once a year, such as a year-end and a new year. For example, an operation log pertaining to an air cooling function of an air conditioner in winter has a low occurrence frequency. Thus, a variability of the operation log may be set to be high. A variability of an operation log when a natural calamity such as a torrential rain and an earthquake may be set based on an occurrence frequency of the natural calamity.

The third value index may be indicated with, for example, an index value in four levels including "3: particularly large," "2: large," "1: medium," and "0: small" in descending order of variability. Index values of the third value index may be associated in advance with, in a table, periods when the above-described events are held, periods when natural calamities happen, periods when climate changes happen, or periods other than the above-described periods.

Value calculator 102 also calculates a data value of each operation log based on value reference information added to the operation log. For each operation log being a target of calculation, value calculator 102 calculates a value of the operation log based on index values that are determined in the first value index, the second value index, and the third value index included in value reference information added to the operation log being a target of calculation, and based on values that are associated in advance with the first value index, the second value index, and the third value index. For example, value calculator 102 may calculate, as the data value, a value based on a total value of the index value of the first value index, the index value of the second value index, and the index value of the third value index included in the value reference information added to the operation log being a target of calculation. The data value may be calculated as a value that increases with an increase in the total value. That is, the data value may be set to a value that is associated with a total value via a monotone increasing function. Instead of the total value, a value obtained as the weighted sum of index values of the value indices may be used.

Note that the plurality of tables associated with the index values of the first value index, the second value index, and the third value index may be determined in such a manner as to vary over time. For example, in the table in which the index values of the first value index are associated, the index values associated with operation log types may be changed for each operation log type. For example, in the table in which the index values of the second value index are associated, the index values associated with types of home appliances generating operation logs may be changed for each type of a home appliance. For example, in the table in which the index values of the third value index are associated, the index values associated with periods when operation logs are generated may be changed for each period.

The values that are associated in advance with the index values determined in the first value index, the second value index, and the third value index may be determined in such a manner as to vary over time.

Note that the data value may be calculated at the time when an operation log is generated, using the plurality of tables that are the latest at that time and the latest value associated in advance. In this case, to the operation log, the data value may be added in addition to the value reference information, or the data value may be added instead of the value reference information.

Note that the data value may be calculated at the time when a use request to use an operation log is received, using the plurality of tables that are the latest at that time and the latest value associated in advance. In this case, value reference information is not added to the operation log, and when the use request is received, value reference information determined using the plurality of the tables that are the latest at that time may be added to the operation log. The data value may be then calculated using the value reference information added at that time and the latest value associated in advance.

Note that value calculator 102 may calculate, as a data value to be added to an operation log, a data value that increases with a decrease in occurrence frequency of the operation log.

Payment determiner 103 calculates a usage charge of one or more operation logs used by a specific data user. Specifically, payment determiner 103 determines used data to be processed based on use record DB 107. Payment determiner 103 determines, as the used data to be processed, one of the one or more operation logs used by the specific data user. Payment determiner 103 may determine the one or more operation logs in turn as the used data to be processed. As the one or more operation logs used by the specific data user, payment determiner 103 identifies an operation log that is associated with user identifying information (user ID) that identifies the specific data user in use record DB 107.

Payment determiner 103 then identifies, in provision record DB 106, data that is an operation log associated with data identification information being identical to the data identification information of the determined used data to be processed and identifies a data value of the identified data and a data manager of the data. Note that payment determiner 103 identifies manager identification information (manager registration ID) that is recorded in association with the data identification information, thereby identifying a data manager indicated by the manager identification information.

Note that payment determiner 103 may identify value reference information that is recorded in association with the data identification information rather than identifying a data value that is recorded in association with the data identification information. Payment determiner 103 may then cause value calculator 102 to calculate a data value based on the identified value reference information and obtain the data value calculated.

Payment determiner 103 determines an incentive to be given to the data manager determined, based on the data value determined. The incentive may be set to be the data value itself, may be calculated by subtracting a certain value from the data value, may be calculated by multiplying the data value by a certain value, may be calculated by subtracting a value based on the data value from the data value, or may be calculated by multiplying the data value by a value based on the data value.

Payment determiner 103 may perform the calculation on not only the one or more operation logs used by the specific data user but also one or more operation logs used by each of a plurality of data users. Accordingly, whenever one operation log is used once, payment determiner 103 calculates an incentive to be given to a data manager of the operation log. Thus, payment determiner 103 can determine incentives for data managers of operation logs based on amounts of use of the operation logs. Therefore, payment determiner 103 can calculate an incentive for each data manager by totalizing, for the data manager, incentives each of which is calculated whenever one operation log is used once.

Note that, in provision record DB 106, an operation log and the number of uses of the operation log may be recorded in association with each other. In this case, payment determiner 103 identifies a data value of the operation log and multiplies the identified data value by the number of uses. This can make it easy to calculate, for each operation log, an incentive to be paid to a data manager when the operation log is used. In short, an incentive for a data manager may be determined based on a data value of data identified and the number of uses of the data identified.

The calculation of an incentive may be performed every specified time period such as one month and two months. Since the number of times an incentive is calculated decreases as a specified time period becomes longer (365 times per year when the calculation is performed every day as opposed to 6 times per year when the calculation is performed every two months), it is possible to reduce throughput of a processor. After an incentive is calculated, the incentive calculated is paid to a data manager.

Payment determiner 103 also identifies, for each of one or more data users, a data value of each of one or more operation logs used by the data user and combines the data values of the one or more operation logs, thereby calculating a usage charge for a specific data user. The calculation of a usage charge may be performed every specified time period such as one month. After a usage charge is calculated, the usage charge calculated is collected from a data user.

Note that an operation log that is a target of calculation of an incentive is an operation log that has been used by a data user and on which an incentive to be paid to a data manager has not been calculated yet. In addition, an operation log that is a target of calculation of a usage charge is an operation log that has been used by a data user and on which a usage charge to be collected from a data user has not been calculated yet. That is, an operation log being a target of calculation is one or more operation logs that are used after the use of one or more operation logs being a previous target of calculation. In the case where the calculation of a usage charge is performed every specified time period, an operation log being a target of calculation is an operation log that is used by a data user in the latest specified time period.

Recorder 104 records one or more operation logs of home appliances 21a to 21x and 22a to 22x received by communication unit 101 on usage history DB 105. Each of the one or more operation logs includes, for example, manager identification information (manager registration ID) that identifies a data manager of the operation log, type information that indicates a type of a home appliance that generates the operation log, an individual number that uniquely identifies the home appliance that generates the operation log, time point information that indicates a time point at which the operation log is generated, and detail information that indicates a detail of the operation log.

FIG. 3 is a diagram illustrating an example of a data format of operation logs that are sent from connection devices according to Embodiment 1.

A row in the table illustrated in FIG. 3 indicates an operation log. In FIG. 3, a household ID is an ID that is added for each dwelling 40. The household ID is an example of provider identification information. The household ID may be, for example, an ID that is added by connection device 20. For example, JP10-200153 indicates dwelling 40 of the 200153rd household in the 10th prefecture in Japan (e.g., Fukushima prefecture).

A home appliance model ID is an ID that is added for each model of a home appliance. The home appliance model ID is an example of type information. For example, Pa-TV-19-42-VX1 indicates a TV from the company Pa, VX1 type, 42-inch, 2019 fiscal year model. For example, Hi-RF-17-500-S2 indicates a refrigerator from the company Hi, S2 type, 500-L capacity, 2017 fiscal year model. For example, Ri-ES-18-201 indicates an electric range from the company Ri, 201 type, 2018 fiscal year model.

An individual number is an ID that is added to each home appliance. For example, 19-08-10-02224 indicates a home appliance that is manufactured the 02224th on manufacturing equipment line 10 in August, 2019.

An operation time indicates a time of an operation. The operation time is an example of time point information indicating a time point at which an operation log is generated. For example, 2020-10-08-05 indicates that an operation is made at 5:25:15 on Oct. 8, 2020.

An operation detail indicates a detail of an operation performed on a home appliance. The operation detail is an example of detail information indicating a detail of an operation log.

FIG. 4 is a diagram illustrating an example of a manager registration look-up table according to Embodiment 1.

In the manager registration look-up table, a home appliance model ID and a manager registration ID show a correspondence. In other words, the manager registration look-up table is information indicating a model of a home appliance that generates data managed by a data manager. For example, the manager registration ID of 02-003 indicates a section denoted by 003 in a home appliance manufacturer denoted by 02.

FIG. 5 is a diagram illustrating an example of a data format of operation logs that are recorded on a usage history DB according to Embodiment 1.

A row in the table illustrated in FIG. 5 indicates an operation log. An operation log in FIG. 5 is an information item that is an operation log illustrated in FIG. 3 to which a home appliance usage history ID, a manager registration ID, and a value reference information item are added.

The home appliance usage history ID is an information item added to each of one or more operation logs. The home appliance usage history ID is an example of data identification information.

The manager registration ID is an information item added to each of one or more operation logs. A manager registration ID added to an operation log is a manager registration ID that is associated, in the manager registration look-up table, with a home appliance model ID included in the operation log.

The value reference information is an information item added to each of one or more operation logs and is an information item calculated by value calculator 102. Details of the value reference information have been described in the description of value calculator 102 and thus will be omitted.

Recorder 104 records, on provision record DB 106, a provision record information item in which a manager registration ID that identifies a data manager of one or more operation logs received by communication unit 101, a data identification information item that identifies each of the one or more operation logs, and a value reference information item added by value calculator 102 are associated with one another. In the provision record information, a provider ID that identifies a data provider of one or more operation logs may be further associated.

FIG. 6 is a diagram illustrating an example of a data format of provision record information items that are recorded on a provision record DB according to Embodiment 1.

A row in the table illustrated in FIG. 6 indicates a provision record information item of an operation log by a home appliance. A provision record information item in FIG. 6 includes an applied time period, a manager registration ID, a home appliance model ID, an individual number, and a provided information amount.

The applied time period indicates a time period including time points at which provision record information items are provided. The provided information amount indicates, for each home appliance, the number of provisions of operation logs of the home appliance during the applied time period.

Recorder 104 also records, on use record DB 107, an operation log sent to user terminal 30 by communication unit 101 in response to a use request or an operation log that forms a basis of analysis data. Whenever an operation log is sent to user terminal 30, recorder 104 records a use record information item on use record DB 107. That is, recorder 104 records, on use record DB 107, the use record information item in association with a user ID and an operation log ID.

FIG. 7 is a diagram illustrating an example of a data format of use record information items that are recorded on a use record DB according to Embodiment 1.

A row in the table illustrated in FIG. 7 indicates a use record information item. A use record information item in FIG. 7 includes a user ID, a home appliance usage history ID, a manager registration ID, and a home appliance model ID.

Here, refer back to FIG. 2. Manager registration changer 108 changes a specific manager registration ID in a provision record information item based on a change request received by communication unit 101. The specific manager registration ID is a manager registration ID that is associated with a specific individual number being a specific data ID in the provision record information. The specific individual number is a data identification information item that identifies a specific data item generated by a specific home appliance. Manager registration changer 108 changes, for example, based on a change request, a first manager registration ID that is associated with a first data identification information item that identifies each of one or more first data to a second manager registration ID that is different from the first manager registration ID. The change request in this case is, for example, a request to change first manager identification information associated with the first data identification information that identifies each of one or more first data items generated by a first home appliance, to second manager identification information.

FIG. 8 is a diagram illustrating an example of a data format of a change request according to Embodiment 1.

A row in the table illustrated in FIG. 8 indicates a change request. A change request in FIG. 8 includes a target home appliance model ID, a current manager registration ID, and a successor manager registration ID.

The target home appliance model ID is an information item that identifies a model of a home appliance on which a manager registration ID is to be changed.

The current manager registration ID is a manager registration ID before a change based on a change request. That is, the current manager registration ID is an example of a first manager registration ID (first manager identification information).

The successor manager registration ID is a manager registration ID after the change based on the change request. That is, the successor manager registration ID is an example of a second manager registration ID (second manager identification information).

Note that one or more data items are provided by one or more data providers. The one or more data providers and the one or more data managers are mutually different. This will be described below specifically. For example, a first data provider has a first home appliance of a first model and a second home appliance of a second model different from the first model, and a second data provider has a third home appliance of the first model and a fourth home appliance of the second model. A first data manager manages data provided by the first home appliance and the third home appliance, that is, data provided by home appliances of the first model. A second data manager manages data provided by the second home appliance and the fourth home appliance, that is, data provided by home appliances of the second model.

[Connection Device 20]

Figure 9:
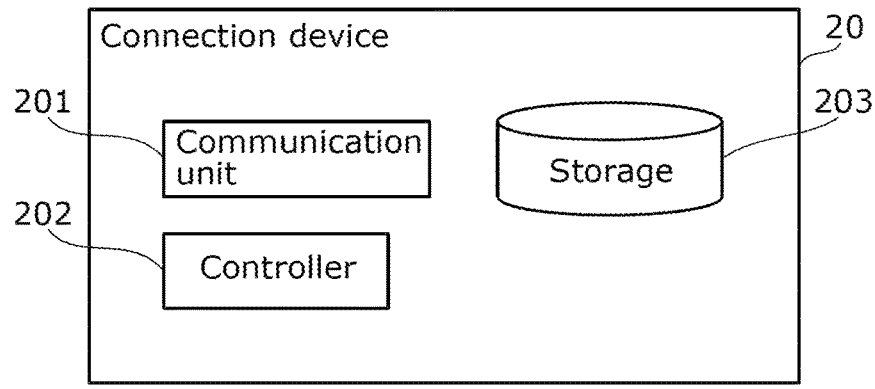
FIG. 9 is a diagram illustrating an example of a configuration of a connection device according to Embodiment 1.

FIG. 9 is a diagram illustrating an example of a configuration of a connection device according to Embodiment 1.

Connection device 20 is connected to and capable of communicating with home appliances 21 and 22. Connection device 20 sends operation logs that are obtained by being sent from home appliances 21 and 22 or obtained by connection device 20 connecting to home appliances 21 and 22, to management server 10 via network N. Connection device 20 may be a router that has a function of at least one of a wireless LAN function and a wired LAN function. Connection device 20 includes communication unit 201, controller 202, and storage 203. Connection device 20 can be implemented by a processor executing a specified program using a memory. The constituent components will be described below.

Communication unit 201 communicates with home appliances 21 and 22. Accordingly, communication unit 201 obtains operation logs of home appliances 21 and 22 from home appliances 21 and 22. Communication unit 201 also communicates with management server 10 via network N. For example, communication unit 201 sends operation logs obtained from home appliances 21 and 22 to management server 10. Communication unit 201 may be connected to home appliances 21 and 22 via either wireless communication or wired communication.

Controller 202 causes storage 203 to store the operation logs obtained by communication unit 201. Controller 202 may control communication unit 201 to control a timing for obtaining the operation logs from home appliances 21 and 22. The timing for obtaining may be every specified time period, at a predetermined time point, or at a time point satisfying a specified condition. Controller 202 may also control communication unit 201 to control a timing for sending an operation log stored in storage 203 to management server 10. Since the number of times communication unit 201 is controlled decreases as a specified time period becomes longer, it is possible to reduce the throughput of the processor. Note that controller 202 may control communication unit 201 to send a plurality of operation logs stored in storage 203 collectively to management server 10. Since sending the plurality of operation logs collectively decreases the number of times communication unit 201 is controlled, compared to sending individual operation logs one by one, it is possible to reduce the throughput of the processor. The timing for sending may be every specified time period, at a predetermined time point, or at a time point satisfying a specified condition.

Storage 203 stores operation logs obtained by communication unit 201. Storage 203 may store information necessary for the operation of connection device 20, for example, a program.

[Home Appliance 21]

Figure 10:
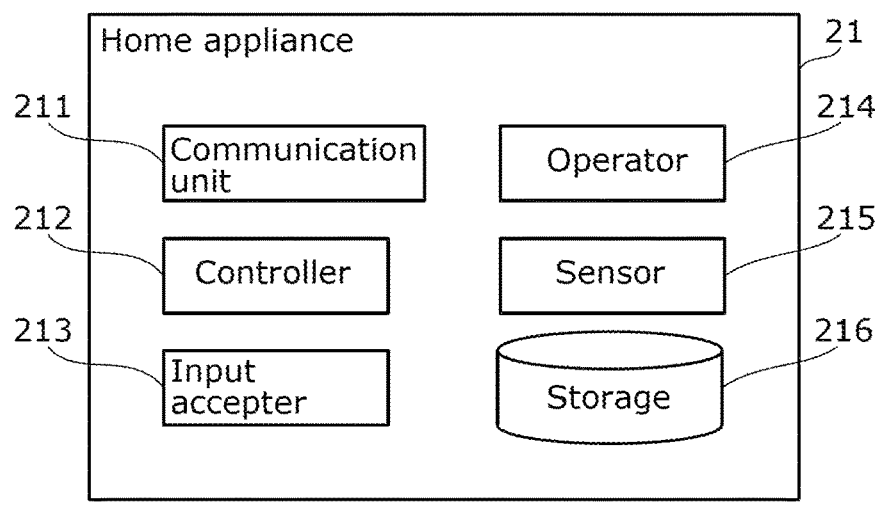
FIG. 10 is a diagram illustrating an example of a configuration of a home appliance according to Embodiment 1.

FIG. 10 is a diagram illustrating an example of a configuration of a home appliance according to Embodiment 1.

Home appliance 21 is placed in dwelling 40. Home appliance 21 is, for example, a home appliance such as a TV, a recording device, an air conditioner, an illuminating device, a washing machine, a refrigerator, and an intercom. Home appliance 21 may be a household facility such as a photovoltaic generator, a fuel cell, an electric shutter, a water heater, and an electronic lock. Home appliance 21 may be a healthcare device such as a body composition monitor, a sphygmomanometer, a thermometer, and a wearable terminal. Home appliance 21 includes communication unit 211, controller 212, input accepter 213, operator 214, sensor 215, and storage 216. Controller 212 of home appliance 21 can be implemented by a processor executing a specified program using a memory. Note that controller 212 of home appliance 21 may be implemented by a dedicated circuit. Home appliance 22 has the same configuration as the configuration of home appliance 21, and thus the description of home appliance 22 will be omitted. The constituent components will be described below.

Communication unit 211 communicates with connection device 20. Communication unit 211 may communicate with management server 10 via network N not via connection device 20. Communication unit 211 sends an operation log of home appliance 21 to connection device 20. Communication unit 211 may be connected to connection device 20 via either wireless communication or wired communication.

Controller 212 generates an operation log by associating together a detail of an operation by a user accepted by input accepter 213, an operation state of operator 214, a result of detection by sensor 215, a detail information item such as information received by communication unit 211 from an external device, a home appliance model ID of home appliance 21, an individual number of home appliance 21, and a time point at which the detail information item is generated. Controller 212 stores the generated operation log in storage 216. Examples of the time point at which the detail information item is generated include a time point at which the detail of the operation is accepted, a time point at which the operation state is changed, a time point at which the detection by sensor 215 is performed or a time point at which sensor 215 is caused to perform the detection, and a time point at which the information from an external device is received. Controller 212 controls communication unit 211 to send an operation log stored in storage 216 to connection device 20. Controller 212 may also control communication unit 211 to control a timing for sending an operation log stored in storage 216 to connection device 20. Note that controller 212 may control communication unit 211 to send a plurality of operation logs stored in storage 216 collectively to connection device 20. Since sending the plurality of operation logs collectively decreases the number of times communication unit 211 is controlled, compared to sending individual operation logs one by one, it is possible to reduce the throughput of the processor. The timing for sending may be every specified time period, at a predetermined time point, or at a time point satisfying a specified condition. Since the number of times communication unit 211 is controlled decreases as a specified time period becomes longer, it is possible to reduce the throughput of the processor. Controller 212 also controls the operation of operator 214.

Input accepter 213 accepts an input from a user. For example, input accepter 213 may be a switch and may accept an input of on or off on the switch from the user. Input accepter 213 may be a receiver of a remote control and may accept an operation by the user by receiving an operation signal that is emitted from the remote control by the user operating the remote control. Alternatively, input accepter 213 may be a touchpad, a touch panel, a keyboard, a mouse, or the like.

Operator 214 implements a function of home appliance 21. For example, in the case of a liquid crystal TV, operator 214 is a backlight, a liquid crystal panel, or the like. In the case of an air conditioner, operator 214 is a compressor, an expansion valve, a fan, or the like. In the case of an illuminating device, operator 214 is a light source. In the case of a washing machine, operator 214 is a motor that rotates a drum, an electronic valve for water supply or water drainage, or the like. In the case of a refrigerator, operator 214 is a compressor, a fan, or the like. In the case of an intercom, operator 214 is a speaker, a microphone, a monitor, or the like.

Sensor 215 detects a state of home appliance 21. Sensor 215 is a temperature sensor, an illuminance sensor, a photodetector sensor, or the like.

Storage 216 stores an operation log generated by controller 212. Storage 216 may store information necessary for the operation of home appliance 21, for example, a program.

[User Terminal 30]

Figure 11:
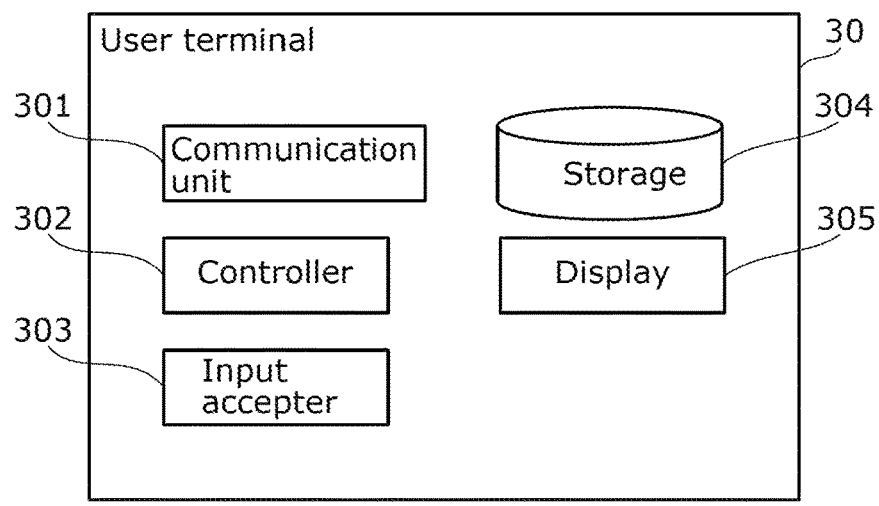
FIG. 11 is a diagram illustrating an example of a configuration of a user terminal according to Embodiment 1.

FIG. 11 is a diagram illustrating an example of a configuration of a user terminal according to Embodiment 1.

User terminal 30 sends a use request to management server 10 and obtains an operation log based on the use request or analysis data of the operation log from management server 10. User terminal 30 may generate analysis data from the operation log and display the generated analysis data on display 305 of user terminal 30. In the case where user terminal 30 obtains the analysis data from management server 10, user terminal 30 may display the obtained analysis data on display 305 of user terminal 30. User terminal 30 is, for example, a computer such as a smartphone, a tablet terminal, and a personal computer. User terminal 30 includes communication unit 301, controller 302, input accepter 303, storage 304, and display 305. User terminal 30 can be implemented by a processor executing a specified program using a memory. The constituent components will be described below.

Communication unit 301 communicates with management server 10 via network N. Accordingly, communication unit 301 sends a use request to management server 10. Communication unit 301 receives an operation log based on the use request or analysis data of the operation log from management server 10.

Controller 302 generates a use request based on an input accepted by input accepter 303. After generating the use request, controller 302 controls communication unit 301 to send the generated use request to management server 10. Controller 302 may also generate analysis data based on the operation log received by communication unit 301. Controller 302 may also cause display 305 to display the analysis data received by communication unit 301.

Here, a use request will be described with reference to FIG. 12.

FIG. 12 is a diagram illustrating an example of a data format of a use request according to Embodiment 1.

A row in the table illustrated in FIG. 12 indicates a use request. A use request in FIG. 12 includes a user ID, an application time, and a use application detail.

The user ID is user identifying information that identifies a user of user terminal 30. The application time is a time point at which the use request is generated. The use application detail indicates a condition for extracting one or more operation logs desired by a data user from a plurality of operation logs stored in management server 10. For example, in the case of a survey of reservation times of washing machines in fiscal year 2020, the use application detail indicates a condition for extracting reservation times in operation logs generated by washing machines in fiscal year 2020. For example, in the case of information of detergents used in and after August, fiscal year 2020, the use application detail indicates a condition for extracting brands of detergents used in operation logs generated by washing machines in and after August, fiscal year 2020. For example, in the case of recording states at 11 p.m. on Nov. 3, 2020, the use application detail indicates a condition for extracting recording states in operation logs generated by recording devices at 11 p.m. on Nov. 3, 2020. The recording states may each include a channel on which a recording is performed, a recorded program, and the like.

Input accepter 303 accepts an input from a user. Alternatively, input accepter 303 may be a touchpad, a touch panel, a keyboard, a mouse, or the like.

Storage 304 stores an operation log or analysis data received by communication unit 301. Communication unit 301 may store information necessary for the operation of user terminal 30, for example, a program.

Display 305 displays analysis data. Display 305 is, for example, a display.

[Manager Registration Terminal 50]

Figure 13:
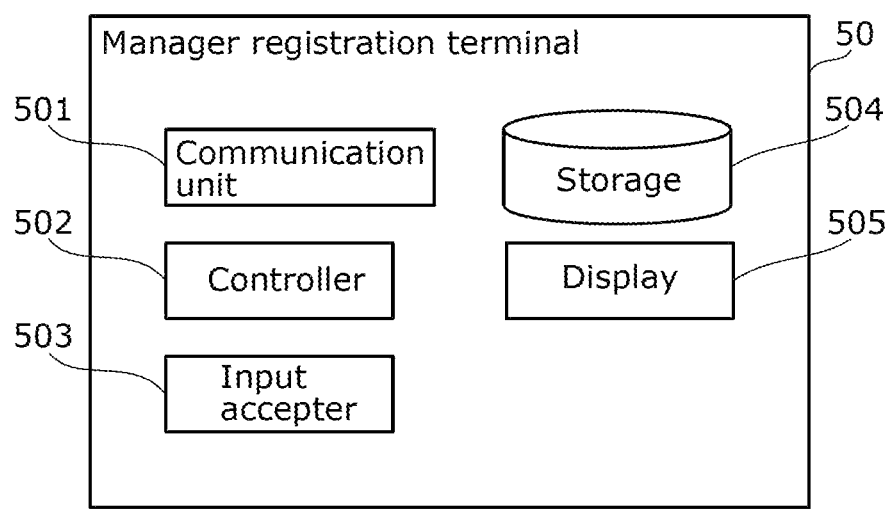
FIG. 13 is a diagram illustrating an example of a configuration of a manager registration terminal according to Embodiment 1.

FIG. 13 is a diagram illustrating an example of a configuration of a manager registration terminal according to Embodiment 1.

Manager registration terminal 50 generates a change request and sends the generated change request to management server 10. Accordingly, manager registration terminal 50 causes management server 10 to change a manager registration ID based on the change request. Manager registration terminal 50 may obtain a result of the change of the manager registration ID from management server 10 and cause display 505 of manager registration terminal 50 to display the result of the change. Manager registration terminal 50 is, for example, a computer such as a smartphone, a tablet terminal, and a personal computer. Manager registration terminal 50 includes communication unit 501, controller 502, input accepter 503, storage 504, and display 505. Manager registration terminal 50 can be implemented by a processor executing a specified program using a memory. The constituent components will be described below.

Communication unit 501 communicates with management server 10 via network N. Accordingly, communication unit 501 sends a change request to management server 10. Communication unit 501 receives a result of a change of a manager registration ID based on the change request, from management server 10.

Controller 502 generates a change request based on an input accepted by input accepter 503. After generating the change request, controller 502 controls communication unit 501 to send the change request generated to management server 10. Controller 502 may also cause display 505 to display the result of the change received by communication unit 501.

Input accepter 503 accepts an input from a user. Alternatively, input accepter 503 may be a touchpad, a touch panel, a keyboard, a mouse, or the like.

Storage 504 stores an operation log or analysis data received by communication unit 501. Communication unit 501 may store information necessary for the operation of user terminal 30, for example, a program.

Display 505 displays analysis data. Display 505 is, for example, a display.

Note that manager registration terminal 50a is a terminal that the first data manager has and is associated with the first manager registration ID of the first data manager, and manager registration terminal 50b is a terminal that the second data manager has and is associated with the second manager registration ID of the second data manager.

Figure 14:
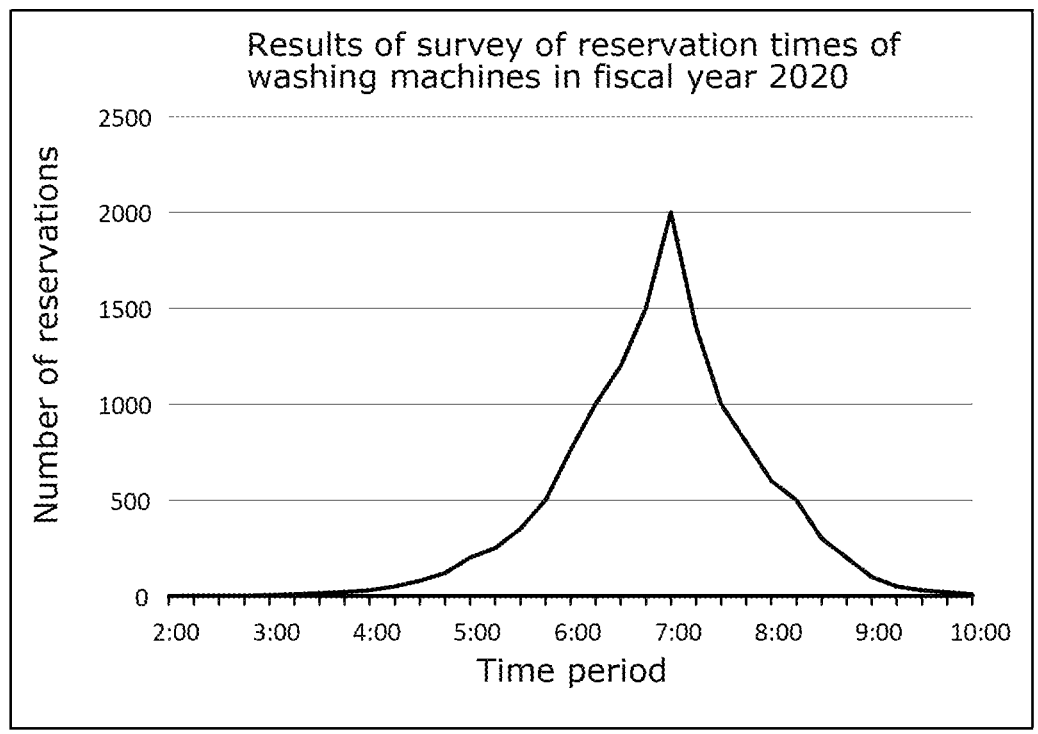
FIG. 14 is a diagram illustrating a first example of analysis data displayed on a user terminal in the management system according to Embodiment 1.
Figure 15:
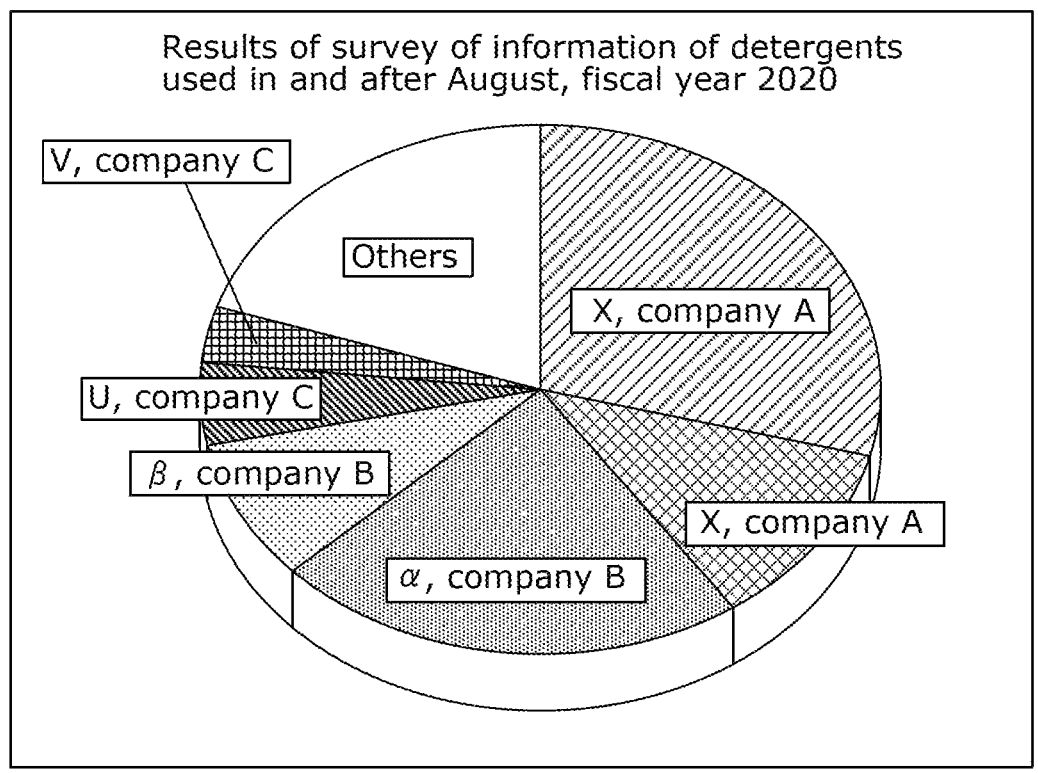
FIG. 15 is a diagram illustrating a second example of analysis data displayed on a user terminal in the management system according to Embodiment 1.
Figure 16:
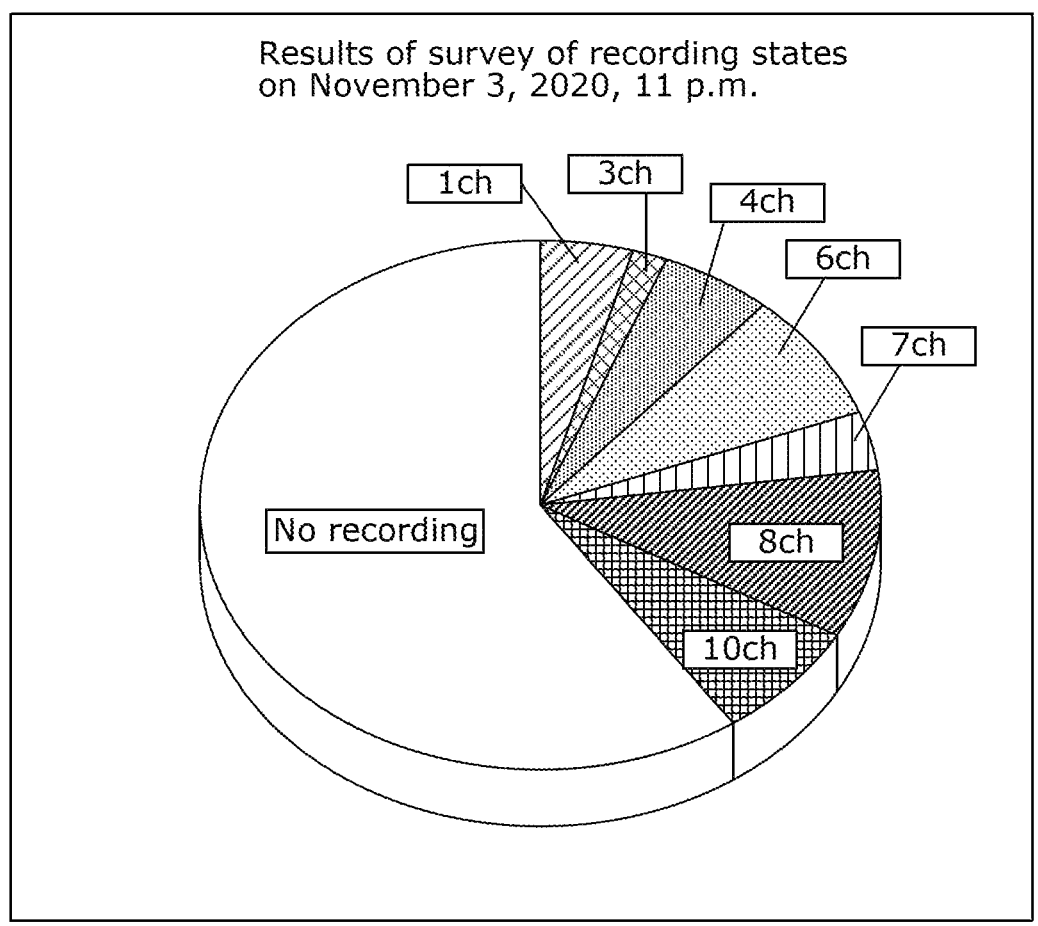
FIG. 16 is a diagram illustrating a third example of analysis data displayed on a user terminal in the management system according to Embodiment 1.

Next, the analysis data will be described with reference to FIG. 14 to FIG. 16. FIG. 14 illustrates a first example of analysis data displayed. FIG. 15 illustrates a second example of analysis data displayed. FIG. 16 illustrates a third example of analysis data displayed.

FIG. 14 is analysis data of a plurality of operation logs that are extracted under a condition for extracting reservation times in operation logs generated by washing machines in fiscal year 2020. In this case, the analysis data is illustrated in a histogram, where its horizontal axis indicates reservation time, and its vertical axis indicates the number of reservations.

FIG. 15 is analysis data of a plurality of operation logs that are extracted under a condition for extracting brands of detergents used in operation logs generated by washing machines in and after August, fiscal year 2020. In this case, the analysis data is illustrated in a pie chart that shows usage rate by detergent brand. Detergent brands include detergent manufacturers.

FIG. 16 is analysis data of a plurality of operation logs that are extracted under a condition for extracting recording states in operation logs generated by recording devices at 11 p.m. on Nov. 3, 2020. In this case, the analysis data is illustrated in a pie chart that shows rate of recording by recording device by channel.

[Operation, Etc. of Management System]

Next, the operation of a management system configured as above will be described below.

Figure 17:
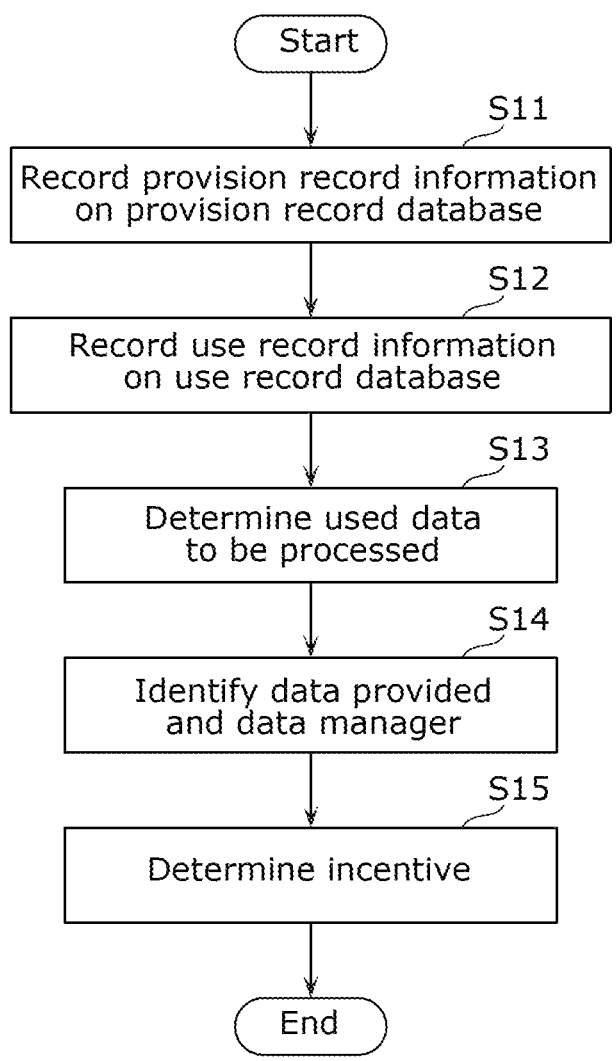
FIG. 17 is a flowchart illustrating incentive determination processing by the management system according to Embodiment 1.

FIG. 17 is a flowchart illustrating incentive determination processing by the management system according to Embodiment 1.

First, management server 10 records, on provision record DB 106, provision record information in which data identification information identifying each of one or more operation logs and manager identification information identifying each of one or more data managers are associated with each other (S11). Management server 10 may further record provider identification information identifying a data provider in association with the provision record information. Management server 10 may further record value reference information serving as a reference for computing a data value of each of one or more operation logs, in association with the provision record information.

Next, management server 10 records, on use record DB 107, use record information including data identification information that identifies used data used by a data user among one or more operation logs (S12).

Next, management server 10 determines used data to be processed based on use record DB 107 (S13).

Next, management server 10 identifies, in provision record DB 106, an operation log that is associated with data identification information being identical to the data identification information of the determined used data to be processed and identifies a data manager that manages the data item identified (S14). Management server 10 may further identify, in provision record DB 106, value reference information and a data provider of the operation log identified.

Next, management server 10 determines an incentive for the data provider identified, based on the value reference information identified (S15).

Next, a specific example of the operation of management system including the incentive determination processing will be described.

Figure 18:
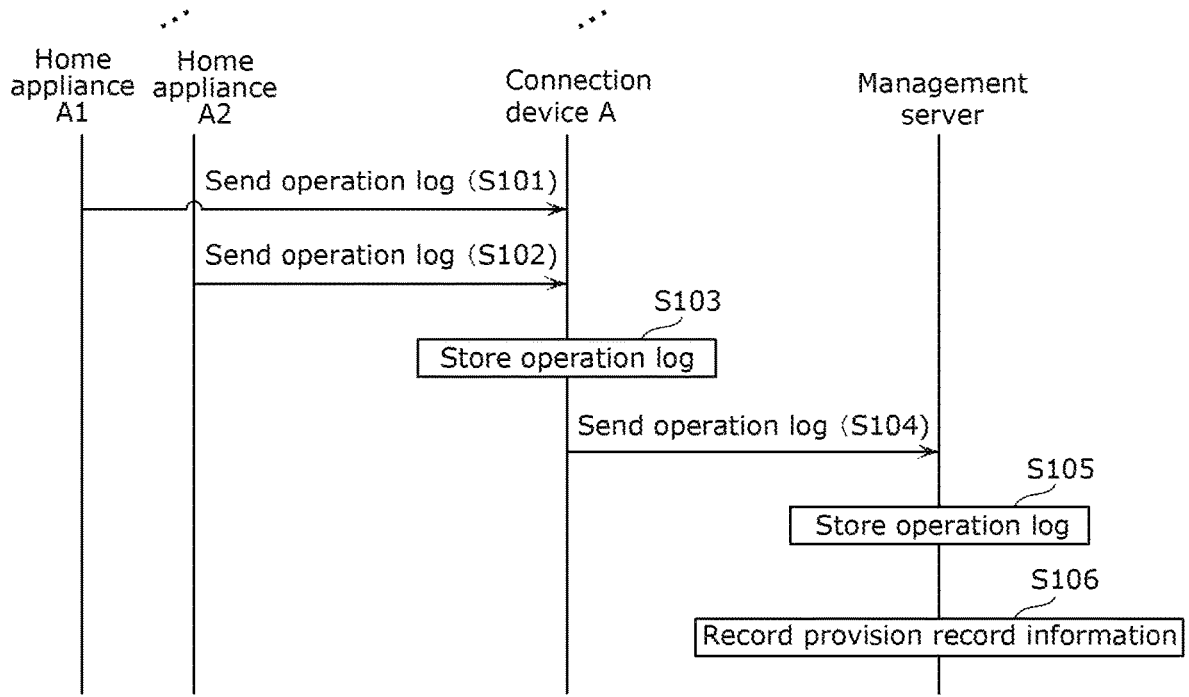
FIG. 18 is a sequence diagram illustrating an example of processing of recording provision record information by the management system according to Embodiment 1 (S11).

FIG. 18 is a sequence diagram illustrating an example of processing of recording provision record information by the management system according to Embodiment 1 (S11).

FIG. 18 exemplifies a configuration of home appliances A1 and A2, and connection device A in only dwelling A among dwelling A to dwelling X. The illustration of a configuration of home appliances B1 to X1 and B2 to X2, and connection devices B to X in other dwelling B to dwelling X is omitted. It is assumed that, in the processing of recording provision record information, home appliances B1 to X1 and B2 to X2, and connection devices B to X perform the same processing as processing by home appliances A1 and A2, and connection device A in only dwelling A.

Home appliance A1 sends an operation log to connection device A at a specified timing (S101).

Home appliance A2 sends an operation log to connection device A at a specified timing (S102). Steps S101 and S102 may be performed with the same timing or may be performed with different timings.

Connection device A stores the operation logs received (S103). For example, connection device A accumulates operation logs received during a specified time period.

Connection device A then sends the operation logs stored to management server 10 via network N with a specified timing (S104). For example, connection device A sends one or more operation logs stored during the specified time period to management server 10 via network N.

Management server 10 stores the operation logs received (S105).

Management server 10 then generates provision record information based on the operation logs received and records the provision record information on provision record DB 106 (S106). Specifically, management server 10 looks up the manager registration look-up table, identifies a manager registration ID associated with a home appliance model ID included in each of the operation logs in the manager registration look-up table, and adds the manager registration ID to the operation log. Management server 10 also adds value reference information based on the operation log to the operation log. Accordingly, the provision record information is generated.

Figure 19:
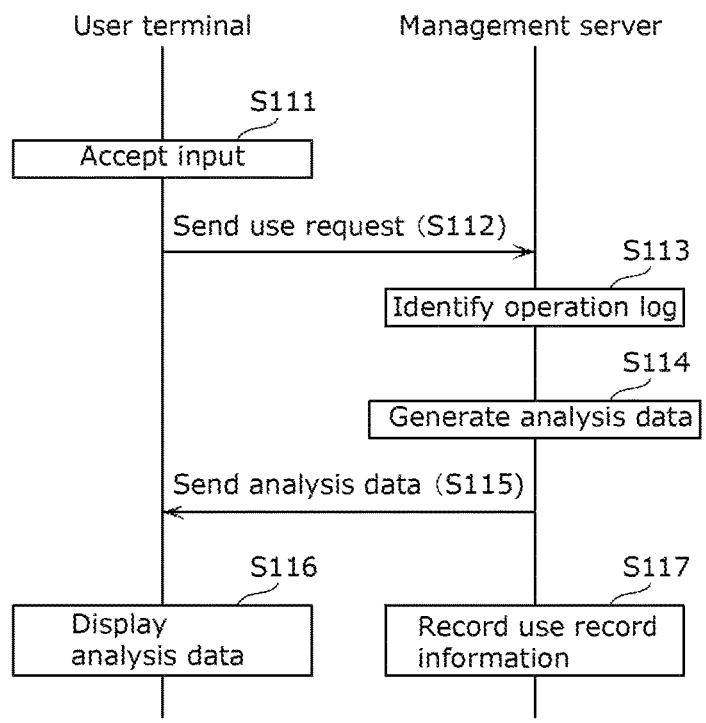
FIG. 19 is a sequence diagram illustrating an example of processing of recording use record information by the management system according to Embodiment 1 (S12).

FIG. 19 is a sequence diagram illustrating an example of processing of recording use record information by the management system according to Embodiment 1 (S12).

Accepting an input from a user, user terminal 30 generates a use request to use an operation log (S111).

Next, user terminal 30 sends the use request generated to management server 10 via network N (S112).

Receiving the use request, management server 10 identifies one or more operation logs based on an extraction condition included in the use request (S113).

Next, management server 10 generates analysis data of the one or more operation logs identified (S114).

Next, management server 10 sends the analysis data generated to user terminal 30 via network N (S115).

Next, user terminal 30 displays the analysis data received (S116).

After step S115, management server 10 generates use record information using the one or more operation logs identified and records the use record information generated on use record DB 107 (S117).

Note that in step S114, management server 10 may send the one or more operation logs based on the extraction condition. In this case, user terminal 30 may generate analysis data using the one or more operation logs and display the analysis data generated.

Figure 20:
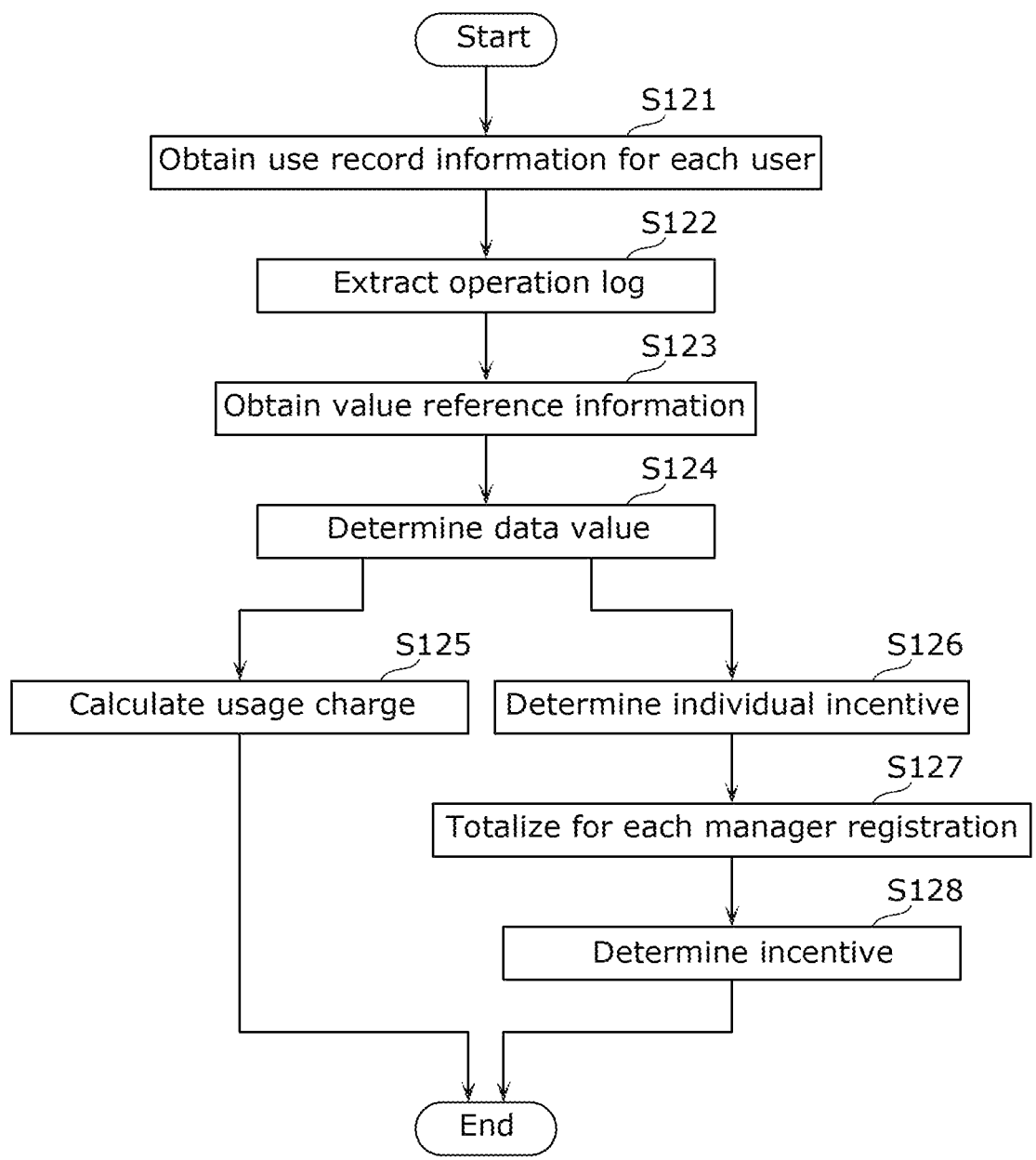
FIG. 20 is a flowchart illustrating an example of processing of calculating a usage charge and an incentive according to Embodiment 1.

FIG. 20 is a flowchart illustrating an example of processing of calculating a usage charge and an incentive according to Embodiment 1.

Management server 10 obtains one or more use record information items from use record DB 107 for each user (S121). For example, a plurality of use record information items having a user ID of A2356 as illustrated in FIG. 7 are obtained.

Next, management server 10 extracts one or more operation logs from the one or more use record information items obtained for each user (S122).

Next, management server 10 obtains, from provision record DB 106, value reference information that is associated with a home appliance usage history ID identical to a home appliance usage history ID being data identification information of the one or more operation logs extracted (S123).

Next, management server 10 determines a data value based on the value reference information obtained (S124).

Management server 10 determines data values of the one or more operation logs obtained.

Next, based on the data values determined, management server 10 calculates a usage charge for each user by combining the data values of the one or more operation logs extracted from the one or more use record information items of the user (S125).

In addition, based on the data values of the one or more operation logs, management server 10 determines an individual incentive, which is an incentive about each of the one or more operation logs (S126). That is, management server 10 determines one or more individual incentives corresponding to the one or more operation logs.

Next, management server 10 totalizes the one or more individual incentives for each manager registration ID (i.e., for each data manager) (S127).

Next, management server 10 determines the individual incentives that are totalized for each manager registration ID every specified time period, as an incentive for each data manager (S128).

Figure 21:
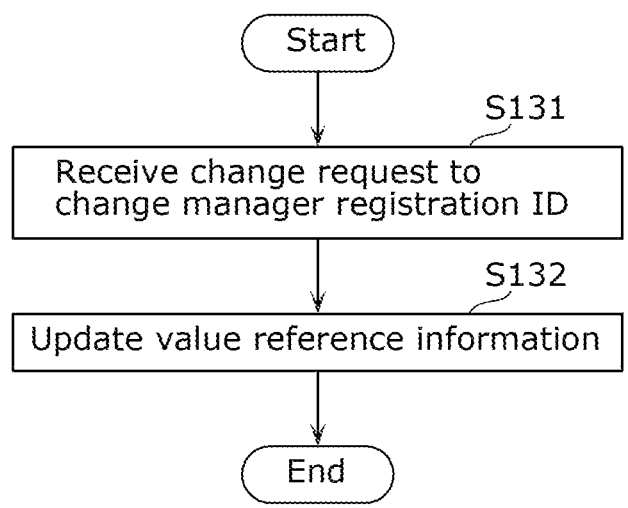
FIG. 21 is a flowchart illustrating an example of processing of changing a manager registration ID according to Embodiment 1.

FIG. 21 is a flowchart illustrating an example of processing of changing a manager registration ID according to Embodiment 1.

Management server 10 receives a change request to change a manager registration ID from manager registration terminal 50 (S131).

Next, among manager registration IDs in the manager registration look-up table, operation logs recorded on the usage history DB, the provision record information, and the use record information, management server 10 changes the manager registration ID designated by the change request to another manager registration ID (S132).

For example, a change request to change a manager registration ID may be sent from first manager registration terminal 50a, which is associated with the first manager registration ID being a predecessor, or may be sent from second manager registration terminal 50b, which is associated with the second manager registration ID being a successor. Step S132 may be performed after an agreement for the change request has been reached between first manager registration terminal 50a and second manager registration terminal 50b.

Figure 22:
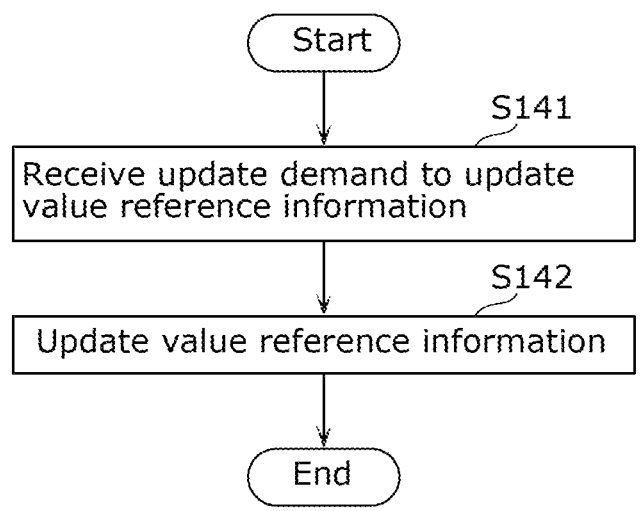
FIG. 22 is a flowchart illustrating an example of processing of updating value reference information according to Embodiment 1.

FIG. 22 is a flowchart illustrating an example of processing of updating value reference information according to Embodiment 1.

Management server 10 receives an update demand to update value reference information from an external device (S141).

Next, management server 10 updates the value reference information with the latest information (S142). Management server 10 may update the value reference information with the latest information based on the update demand. For example, the update demand may include the latest value reference information. The latest value reference information may be determined by a person or may be calculated by a computer with a specified algorithm. Management server 10 may retain the specified algorithm for calculating the latest value reference information.

Advantageous Effects, Etc.

In the management system according to the present embodiment, management server 10 performs the method for determining an incentive for each of one or more data managers that manage data items generated by a plurality of home appliances. The one or more data managers are associated with mutually different models of the plurality of home appliances. In the incentive determination method, management server 10 records provision record information in which data identification information identifying each of one or more data items generated by the plurality of home appliances and manager identification information identifying each of the one or more data managers are associated with each other. Management Server 10 then determines, when the one or more data items include a used data item used by a data user, an incentive for a data manager that manages the used data item, based on the provision record information.

Accordingly, incentives can be determined for different data managers of different models, based on the manager identification information having a high flexibility in changing. Therefore, a profit made by the use of data can be appropriately distributed among the data managers.

In the management system according to the present embodiment, for example, the one or more data items are provided by the one or more data providers having the plurality of home appliances, and the one or more data managers and the one or more data providers are mutually different. Therefore, an incentive for a data manager different from a data provider can be determined.

In the management system according to the present embodiment, for example, a first data provider among the one or more data providers has a first home appliance of a first model and a second home appliance of a second model different from the first model. A second data provider among the one or more data providers has a third home appliance of the first model and a fourth home appliance of the second model. A first data manager among the one or more data managers manages data items provided by the first home appliance and the third home appliance. A second data manager among the one or more data managers manages data items provided by the second home appliance and the fourth home appliance.

Accordingly, a profit obtained by the use of data generated by a home appliance of the first model can be determined as an incentive for the first data manager, and a profit obtained by the use of data generated by a home appliance of the second model can be determined as an incentive for the second data manager. Therefore, a profit made by the use of data can be appropriately distributed among the data managers.

In the management system according to the present embodiment, for example, management server 10 further receives a change request to change specific manager identification information associated with specific data identification information identifying a specific data item generated by a specific home appliance in the provision record information. Next, management server 10 changes the specific manager identification information associated with the specific data item, based on the change request.

Accordingly, the specific manager identification information associated with the specific data identification information item can be easily changed. Therefore, a recipient of an incentive can be easily changed.

In the management system according to the present embodiment, for example, the change request is a request to change first manager identification information, which is associated with first data identification information that identifies each of one or more first data items generated by a first home appliance, to second manager identification information different from the first manager identification information. In the changing, the first manager identification information associated with the first data identification information that identifies each of the one or more first data items is changed to the second manager identification information, based on the change request. The first manager identification information is identification information that identifies a first data manager among the one or more data managers. The second manager identification information is identification information that identifies a second data manager, which is different from the first data manager, among the one or more data managers.

Accordingly, manager identification information associated with the first data identification information can be easily changed from the first manager identification information to the second manager identification information. Therefore, a recipient of an incentive can be easily changed.

In the management system according to the present embodiment, for example, in the determining of the incentive, management server 10 identifies, based on the provision record information, a data item associated with data identification information being identical to data identification information that identifies the used data item and identifies a data manager that manages the data item identified. Management server 10 then determines an incentive for the data manager identified, based on value reference information of the data item identified.

Accordingly, based on used data being data generated by a home appliance and having such a use record that the data has been used, a data manager that manages the use record can be easily identified. Therefore, a recipient of a profit made by the use of data can be appropriately determined.

Embodiment 2

Figure 23:
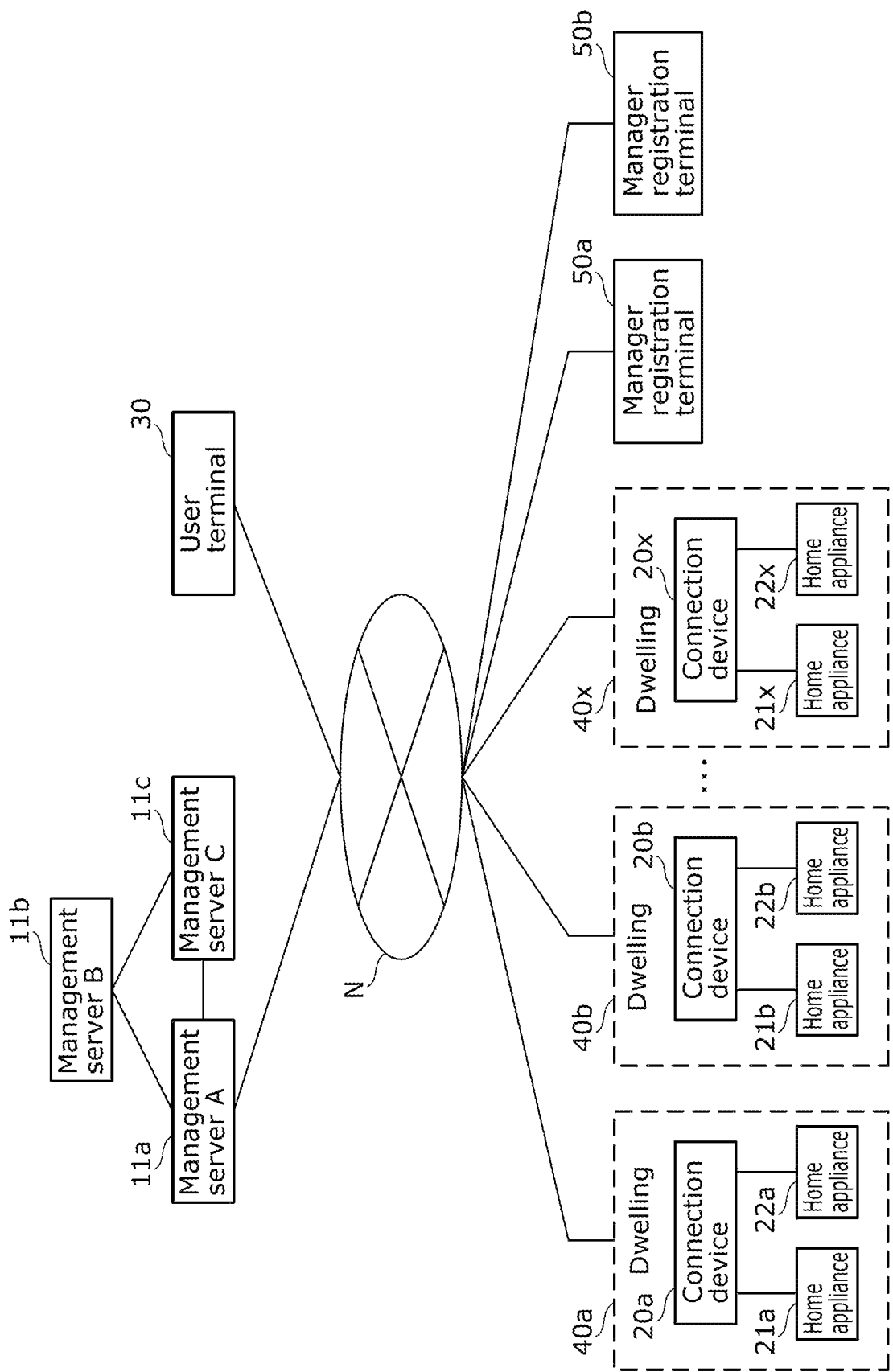
FIG. 23 is a diagram illustrating an example of a configuration of a management system according to Embodiment 2.

FIG. 23 is a diagram illustrating an example of a configuration of a management system according to Embodiment 2.

The management system according to Embodiment 2 differs from the management system according to Embodiment 1 in including a plurality of management servers 11a to 11c as illustrated in FIG. 23.

Hereinafter, management server 11a to management server 10c will be each also referred to as management server 11, and management server 11a to management server 11c may be also referred to as management server A to management server C.

[Management Server 11]

Figure 24:
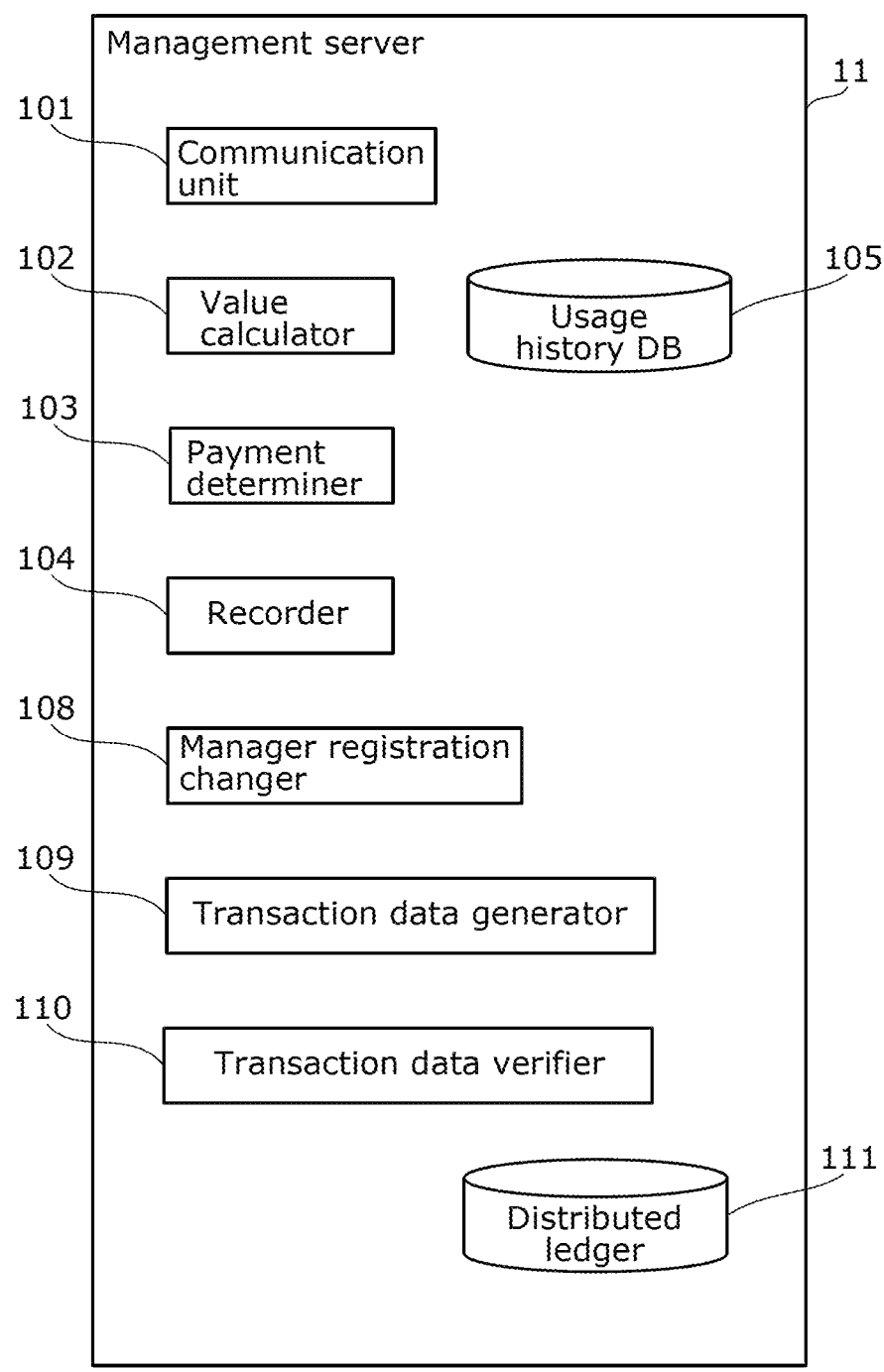
FIG. 24 is a diagram illustrating an example of a configuration of management server 11 according to Embodiment 2.

FIG. 24 is a diagram illustrating an example of a configuration of management server 11 according to Embodiment 2. The same components as those illustrated in FIG. 2 are denoted by the same reference numerals, and detailed descriptions of the components will be omitted.

Management server 11 illustrated in FIG. 24 is an example of one server (computer) of a plurality of servers that hold distributed ledgers. As illustrated in FIG. 24, management server 11 includes communication unit 101, value calculator 102, payment determiner 103, recorder 104, usage history DB 105, manager registration changer 108, transaction data generator 109, transaction data verifier 110, and distributed ledger 111. Management server 11 can be implemented by a processor executing a specified program using a memory. The constituent components will be described below.

Transaction data generator 109 generates first transaction data. In the present embodiment, transaction data generator 109 generates first transaction data that includes provision record information generated by recorder 104.

Transaction data generator 109 also generates second transaction data. In the present embodiment, transaction data generator 109 generates second transaction data that includes use record information generated by recorder 104.

Transaction data generator 109 sends the first transaction data generated to a plurality of other management servers 11 via communication unit 101. Transaction data generator 109 also sends the second transaction data generated to the plurality of other management servers 11 via communication unit 101.

When communication unit 101 receives transaction data, transaction data verifier 110 verifies a validity of the transaction data. For example, transaction data verifier 110 verifies whether a digital signature generated in a proper manner is added to the transaction data received by communication unit 101, and the like. Note that the verification may be skipped. Here, the transaction data received by communication unit 101 is any one of the first transaction data and the second transaction data.

Transaction data verifier 110 also executes a consensus algorithm for agreement with the plurality of other management servers 11 on the validity of the transaction data.

Here, as the consensus algorithm, Practical Byzantine Fault Tolerance (PBFT) may be used, or another known consensus algorithm may be used. Examples of the known consensus algorithm include Proof of Work (PoW), Proof of Stake (PoS), and the like. In the case where PBFT is used as the consensus algorithm, transaction data verifier 110 receives, from the plurality of other management servers 11, reports each indicating whether the verification of the transaction data has succeeded, and transaction data verifier 110 determines whether the number of the reports exceeds a specified number.

When the number of the reports exceeds the specified number, transaction data verifier 110 may determine that the validity of the transaction data has been verified by the consensus algorithm.

When confirming the validity of the transaction data, transaction data verifier 110 causes recorder 104 to record the transaction data.

In the present embodiment, transaction data verifier 110 verifies validities of the first transaction data and the second transaction data received by communication unit 101.

Note that recorder 104 records the transaction data verified by transaction data verifier 110 for the validity, by adding the transaction data to a block and storing the block into distributed ledger 111.

That is, in the present embodiment, in the recording on the provision record DB, management server 11 transmits first transaction data that includes the provision record information to another management server 11, and stores a first block that includes the first transaction data into distributed ledger 111 managed by management server 11, by which the recording on the provision record DB is performed. In addition, in the recording on the use record DB, management server 11 transmits second transaction data that includes the use record information to another management server 11, and stores a second block that includes the second transaction data into distributed ledger 111 managed by management server 11, by which the recording on the use record DB is performed. In this manner, the provision record DB and the use record DB may be stored in distributed ledger 111.

Note that recorder 104 includes distributed ledger 111 built in recorder 104.

Distributed ledger 111 stores the first transaction data and the second token transaction data. Distributed ledger 111 also stores the contract code that executes the processing of calculating a usage charge and an incentive described with reference to FIG. 20.

[Operation, Etc. of Management System]

Next, the operation of a management system configured as above will be described below.

Figure 25:
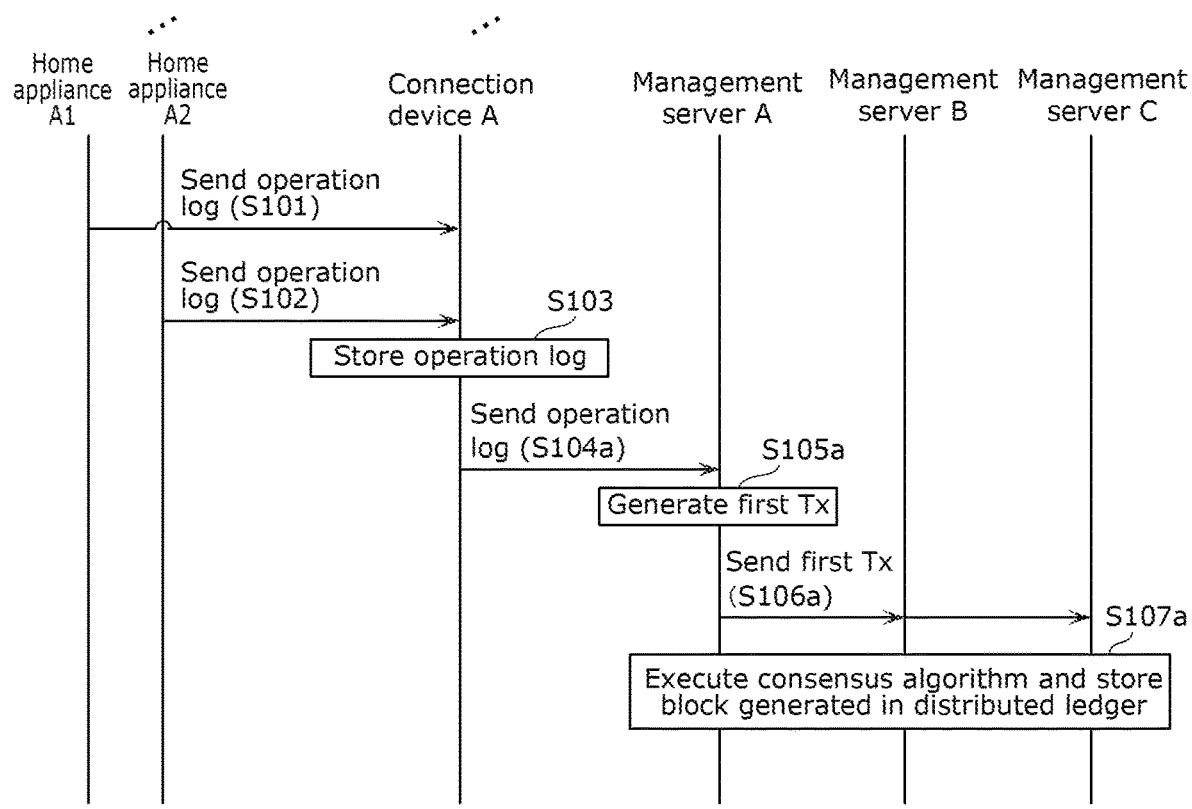
FIG. 25 is a sequence diagram illustrating an example of processing of recording provision record information by the management system according to Embodiment 2 (S11).

FIG. 25 is a sequence diagram illustrating an example of processing of recording provision record information by the management system according to Embodiment 2 (S11). The same processes as those illustrated in FIG. 18 are denoted by the same reference numerals, and detailed descriptions of the processes will be omitted.

FIG. 25 exemplifies, as with FIG. 18, a configuration of home appliances A1 and A2, and connection device A in only dwelling A among dwelling A to dwelling X. The illustration of a configuration of home appliances B1 to X1 and B2 to X2, and connection devices B to X in other dwelling B to dwelling X is omitted. It is assumed that, in the processing of recording provision record information, home appliances B1 to X1 and B2 to X2, and connection devices B to X perform the same processing as processing by home appliances A1 and A2, and connection device A in only dwelling A.

After step S103, connection device A sends the operation logs stored to management server A via network N with a specified timing (S104a). For example, connection device A sends one or more operation logs stored during a specified time period to management server A via network N.

Management server A generates provision record information that includes the operation log received, a manager registration ID, and value reference information, and generates first transaction data including the provision record information (S105a). In FIG. 25, the first transaction data is indicated as first Tx.

Next, management server A sends the first transaction data generated to other management servers B and C (S106a).

Next, management servers A to C each execute the consensus algorithm, generates a block that includes the first transaction data, and stores the block into distributed ledger 111 (S107a). Accordingly, the provision record information included in the first transaction data is stored into the provision record DB.

Note that the first transaction data may be generated by connection device A. In this case, connection device A sends the first transaction data to management server A, and management server A transmits the first transaction data received to other management servers B and C. This may cause step S107a to start.

Figure 26:
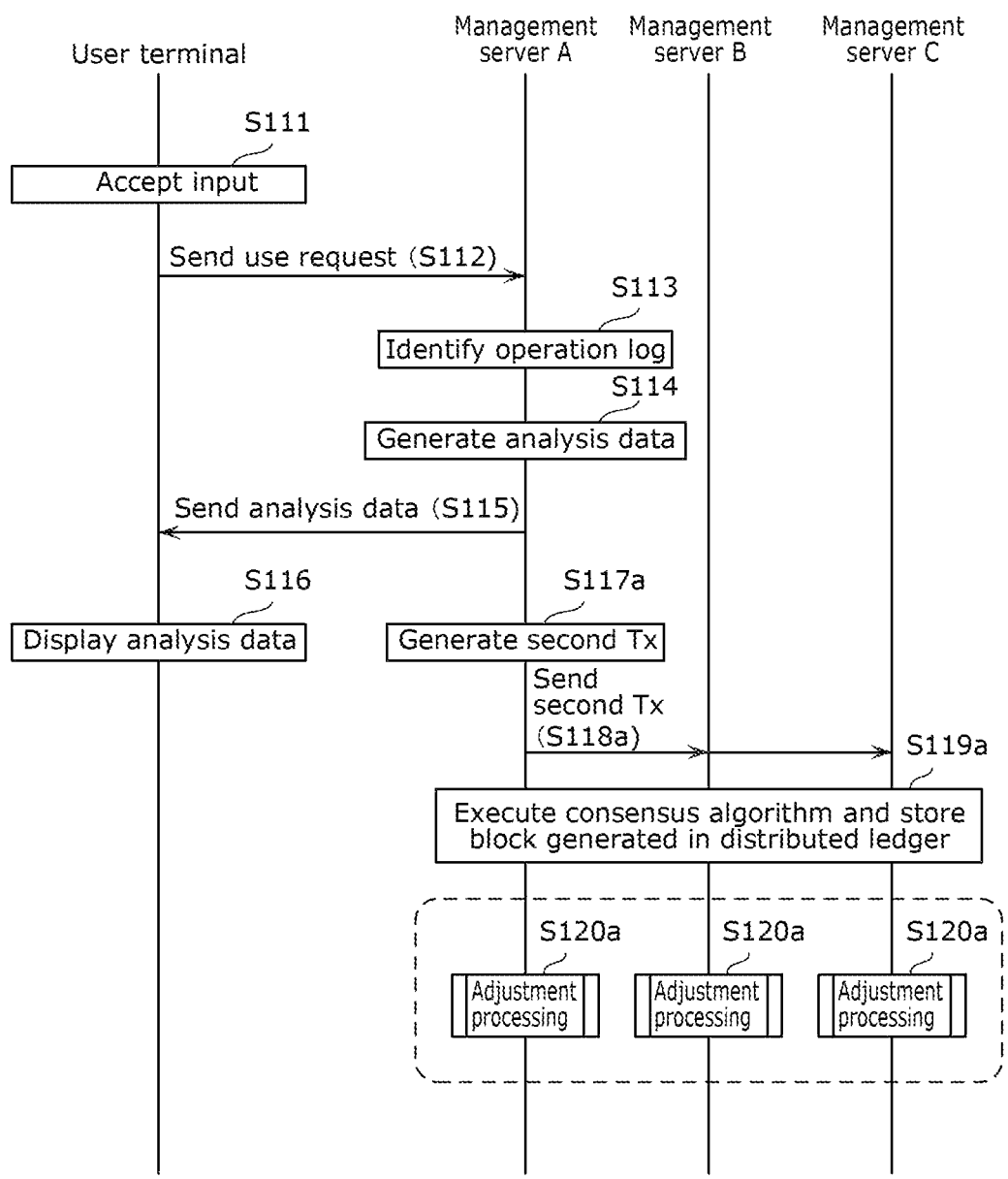
FIG. 26 is a sequence diagram illustrating an example of processing of recording use record information by the management system (S12).

FIG. 26 is a sequence diagram illustrating an example of processing of recording use record information by the management system (S12). The same processes as those illustrated in FIG. 19 are denoted by the same reference numerals, and detailed descriptions of the processes will be omitted.

After step S114, management server A generates use record information using one or more operation logs identified and generates second transaction data that includes that use record information generated (S117a). In FIG. 26, the second transaction data is indicated as second Tx.

Next, management server A sends the second transaction data generated to other management servers B and C (S118a).

Next, management servers A to C each execute the consensus algorithm, generates a block that includes the second transaction data, and stores the block into distributed ledger 111 (S119a). Accordingly, the use record information included in the second transaction data is stored into the use record DB.

Next, after the consensus algorithm is executed on the second transaction data, management servers A to C each execute processing of calculating a usage charge and an incentive by smart contract (S120a). The processing of calculating the usage charge and the incentive is the same as the processing described with reference to FIG. 20. Therefore, detailed description of the processing of calculating will be omitted. In FIG. 26, the process of step S120a will be indicated as adjustment processing.

In this manner, each of a plurality of distributed ledgers 111 held by management servers A to C includes a contract code for executing identifying of a data manager and determining of an incentive for the data manager identified, based on the second transaction data item. In the identifying of the data manager and the determining of the incentive for the data manager identified, when obtaining the second transaction data, management servers A to C each execute the contract code included in distributed ledger 111 held by management server A, thereby executing the identifying of the data manager and the determining of the incentive for the data manager identified.

Advantageous Effects, Etc.

In the management system according to the present embodiment, management server 11 further records provision record information on the provision record database. Management server 10 records, on the use record database, use record information including data identification information that identifies a used data. In the recording on the provision record database, management server 10 transmits first transaction data that includes the provision record information to another management server 10, and stores a first block that includes the first transaction data into a distributed ledger managed by management server 10, by which the recording on the provision record database is performed. In the recording on the use record database, management server 10 transmits a second transaction data that includes the use record information to another management server 10, and stores a second block that includes the second transaction data into a distributed ledger managed by management server 10, by which the recording on the use record database is performed.

Accordingly, the provision record information and the use record information can be stored into the distributed ledger. Thus, an incentive for a data manager can be determined using the provision record information and the use record information that do not easily cause system down and are difficult to falsify. Therefore, an incentive for a data manager can be determined more appropriately.

In the management system according to the present embodiment, for example, each of a plurality of distributed ledgers held by management server 11 and another management server 11 includes a contract code for executing the identifying of a data manager and the determining of an incentive for the data manager identified, based on second transaction data. The identifying of the data manager and the determining of the incentive for the data manager identified are executed by obtaining the second transaction data and executing the contract code included in the distributed ledger held by the computer.

Accordingly, the identifying of the data manager and the determining of the incentive for the data manager identified are executed by executing the contract code. Thus, an incentive for a data manager can be automatically determined using the provision record information and the use record information that are difficult to falsify.

In the management system according to the present embodiment, for example, the provision record information further includes a hash value of data.

Accordingly, provision record information stored in a distributed ledger includes a hash value instead of data. Thus, the data can be made not open to the public.

Modifications

In the management systems according to the above embodiments, management server 10 may further determine an incentive for a data provider. The incentive for the data provider determined in this case may be paid from a data manager to the data provider.

An incentive determination method according to an aspect of the present disclosure is an incentive determination method executed by a computer for determining an incentive for each of one or more data providers that provide data items generated by home appliances. The incentive determination method includes: recording a provision record information in which provider identification information identifying each of the one or more data providers, data identification information identifying each of one or more provided data items provided by the one or more data providers, and value reference information serving as a reference for computing a data value of each of the one or more provided data items are associated with one another; and determining, when the one or more provided data items include a used data item used by a data user, an incentive for a data provider that provides the used data item, based on the provision record information. The value reference information includes an index value that is determined for each of a plurality of value indices.

Accordingly, for a provided data item used by a user among one or more provided data items provided by one or more data providers, an incentive for a data provider of the provided data item is determined based on an index value determined in each of a plurality of value indices that are associated with the provided data item. In this manner, a provided data item is associated with an index value determined in each of a plurality of value indices. Thus, a data value of the provided data item can be determined in advance in the plurality of value indices. Furthermore, since a provided data item is associated with an index value determined in each of a plurality of value indices, even when there is a bias in one of the value indices, the bias can be mitigated. Thus, a data value of a provided data item can be determined to be an appropriate value. Therefore, an incentive for a data provider can be determined more appropriately, and it becomes possible to encourage providers to provide provided data items. As a result, it is possible to gather data items efficiently.

In the determining of the incentive, a provided data item associated with data identification information identical to data identification information that identifies the used data item may be identified based on the provision record information, value reference information of the provided data item identified and a data provider that provides the provided data item identified may be identified, and an incentive for the data provider identified may be determined based on the value reference information identified.

Furthermore, use record information including data identification information identifying the used data may be recorded on the use record database, the number of uses of the provided data item identified may be identified based on the use record database, and in the determining of the incentive, an incentive to the data provider identified may be determined based on the value reference information identified and the number of uses identified.

The plurality of value indices in the value reference information may include at least two of a value index based on a type of the provided data item, a value index based on a type of a home appliance generating the provided data item, and a value index based on a period when the provided data item is generated by the home appliance.

Furthermore, the provision record information may be recorded on the provision record database, in the recording on the provision record database, the computer may transmit a first transaction data item that includes the provision record information to another computer, and may store a first block that includes the first transaction data item into a distributed ledger managed by the computer, by which the recording on the provision record database may be performed, and in the recording of the use record database, the computer may transmit a second transaction data item that includes the use record information to the other computer, and may store a second block that includes the second transaction data item into the distributed ledger managed by the computer, by which the recording of the use record database is performed.

Accordingly, the provision record information and the use record information can be stored into the distributed ledger. Thus, an incentive for a provider can be determined using the provision record information and the use record information that are difficult to falsify. Therefore, an incentive for a provider can be determined more appropriately.

Each of a plurality of distributed ledgers held by the computer and the other computer may include a contract code for executing the identifying of the value reference information and the data provider and the determining of the incentive for the data provider identified, based on the second transaction data item, and in the identifying of the value reference information and the data provider and the determining of the incentive for the data provider identified, the identifying of the value reference information and the data provider and the determining of the incentive for the data provider identified may be executed by executing the contract code included in the distributed ledger held by the computer when the second transaction data is obtained.

The provision record information may further include a hash value of the provided data item.

In the determining of the incentive, a value of each used data may be calculated based on an index value determined in each of a plurality of value indices included in the value reference information identified and a value associated in advance with each of the plurality of value indices, the incentive may be determined based on the value of the used data calculated, the values associated in advance may be determined in such a manner as to vary over time, and the computer may transmit a third transaction data item that includes the determined values associated in advance, to another computer, and may store a third block that includes the third transaction data item into a distributed ledger managed by the computer.

A server according to the present disclosure is a server that determines an incentive for each of one or more data providers that provides a data item generated by a home appliance. The server includes a processor and a memory and, using the memory, the processor: records a provision record information in which provider identification information identifying each of the one or more data providers, data identification information identifying each of one or more provided data items provided by the one or more data providers, and value reference information serving as a reference for computing a data value of each of the one or more provided data items are associated with one another; and determines, when the one or more provided data items include a used data item used by a data user, an incentive for a data provider that provides the used data item, based on the provision record information. The value reference information includes an index value that is determined for each of a plurality of value indices.

In the management systems according to the above embodiments, operation logs of home appliances are exemplified as an example of data. However, the data is not limited to operation logs of home appliances. The data may be, for example, operation logs of a self-driving vehicle or may be operation logs of equipment installed in a facility such as a factory. Alternatively, the data may be measured values of an electricity meter, measured values of a gas meter, and measured values of a water meter placed in a dwelling.

The function of recording operation logs on usage history DB 105 and usage history DB 105, the function of recording provision record information on provision record DB 106 and provision record DB 106, and a function of recording use record information on use record DB 107 and use record DB 107 in management server 10 according to the above embodiments may be implemented by apparatuses other than management server 10. These apparatuses are to be connected to management server 10 and capable of communicating with management server 10.

In the management systems according to the above embodiments, the data value may vary based on the following factors. For example, the data value may vary based on a reliability of a home appliance that generates an operation log. The reliability of a home appliance may be determined based on, for example, a type of its OS, a track record of updating the OS, a history of operation from the outside, a track record of communicating with the outside, a track record of installing an application, and the like. The track record of updating the OS, the history of operation from the outside, the track record of communicating with the outside, the track record of installing an application, and the like may be written and managed in a database provided in each of management servers 10 and 11. The reliability of a home appliance may be determined using a reliability evaluation table in which a reliability is associated with each of the track records. The reliability of a home appliance may be evaluated based on a combination of a plurality of the track records. A reliability of each operation log may be based on the reliability of a home appliance. Management servers 10 and 11 may calculate a data value with reliability by multiplying a data value by the reliability determined and may determine a usage charge or an incentive based on the data value with reliability.

A data value may be calculated based on another element. For example, in the case where a specific need such as "such a kind of data is needed" is accepted from user terminal 30, a data value may be calculated in such a manner that an operation log with more needs has a higher value. Need information indicating the need may be recorded on a database provided in each of management servers 10 and 11. In addition, in usage history DB 105, information indicating the presence or absence of a need may be added, and the presence or absence of the need may be recorded in association with an operation log.

In the management systems according to the above embodiments, it is assumed that the data value varies based on a type of an operation log, a model of a home appliance generating the operation log, a seasonal variation, and the like. However, this is not limiting.

The data value may be determined based on data pertaining to a family composition of a household in a dwelling of a provider, and the like (hereinafter, will be referred to as "using family attribute data"). The using family attribute data includes data pertaining to an individual such as age, sex, height, weight, occupation, place of employment, and income, which are attributes of a family member who makes a use. In this case, the using family attribute data may be combined with a household ID and recorded on a using family attribute database provided in each of management servers 10 and 11.

The data value may vary based on an operation log pertaining to a household that has some designated family attribute. In this case, the column "family attribute evaluation" may be provided and managed in a home appliance usage history database.

In the case where a specific need such as "data pertaining to a household having such a family attribute is needed" is accepted from user terminal 30, a data value may be calculated in such a manner that a value of an operation log generated from a dwelling of a household having a family attribute with many needs becomes higher than a value of an operation log generated from a dwelling of a household having a family attribute with a fewer needs. Need information indicating the need may be recorded on a database provided in each of management servers 10 and 11. In addition, in usage history DB 105, information indicating the presence or absence of a need for a family attribute may be added, and the presence or absence of the need of the family attribute may be recorded in association with an operation log.

The data value may be determined based on the number of transactions. The data value may be calculated in such a manner that a value of an operation log having a large number of times of being needed by user terminal 30 becomes higher than a value of an operation log having a small number of times of being needed by user terminal 30. The number of transactions may be recorded on a distributed ledger using a blockchain to allow a user to refer to the number of repetitions with user terminal 30 while preventing falsification.

An operation log stored in usage history DB 105 may be provided to user terminal 30 when the number of times of being needed by user terminal 30 exceeds a predetermined threshold value. Accordingly, only an operation log having an increased data value is provided. Processing of providing the operation log stored in usage history DB 105 when the number of times of being needed exceeds the threshold value may be implemented by a smart contract in the blockchain.

A value of an operation log that is newly added to an operation log having a large number of times of being needed by user terminal 30 may be set to be high. In the case where an operation log is needed by a plurality of user terminals 30, the operation log may be provided only to user terminal 30 that appreciates the operation log (auction system).

In the management system according to Embodiment 2 described above, it is assumed that the provision record information and the use record information are recorded on and managed in the distributed ledger. However, this is not limiting. A data value calculated by value calculator 102 may be recorded on and managed in the distributed ledger.

The usage charge and the incentive determined by payment determiner 103 may be recorded on a centralized database provided in management server 10 or may be recorded on a distributed ledger using a blockchain provided in each of management servers 11a to 11c.

Collecting a usage charge from a user or a transaction of a payment of an incentive to a manager may be performed using a cryptocurrency using a blockchain.

Note that equipment forming the blockchain may include all or some of connection devices 20 and user terminal 30, in addition to management servers 11a to 11c.

A block including transaction data including an operation log may be recorded on the usage history DB by being stored in the distributed ledger.

In the case where any one of the usage history DB, provision record DB, and the use record DB is recorded on the distributed ledger using the blockchain, an operation log itself need not be recorded, but only a hash value of the operation log may be recorded. That is, provision record information stored in the provision record DB may include a hash value of an operation log and need not include the operation log itself. For only an operation log having a degree of privacy involvement that is a specified threshold value (e.g., 1), management server 11 may convert the operation log into its hash value and may record provision record information including only the hash value of the operation log on the distributed ledger as provision record information of the operation log. Accordingly, a user's privacy can be protected in management server 11 that holds a distributed ledger.

In the management systems according to the above embodiments, it is assumed that an operation log is sent to management servers 10 and 11 through connection device 20 from home appliances 21 and 22 provided in each dwelling 40. That is, it is assumed that a provider of an operation log is an owner of each dwelling 40. However, this is not limiting. For example, a provider of an operation log may be a person who places connection device 20. In the case where dwelling 40 is a rental house, the provider may be an owner of the rental house. In the case of a facility such as a factory, an office, and a warehouse rather than dwelling 40, a provider of an operation log may be a legal person or an organization that has the facility such as a factory, an office, and a warehouse. In this case, provider identification information may be an owner ID.

Other Embodiments

Although the present disclosure has been described so far based on the above-described embodiments, the present disclosure is not certainly limited to those embodiments. The present disclosure includes the following cases.

(1) An example of each device according to the above-described embodiments is a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute their functions. Here, the computer program includes combinations of instruction codes for issuing instructions to the computer to execute predetermined functions.

(2) A part or all of the constituent elements in each of the devices according to the above-described embodiments may be implemented into a single Large Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing each of the constituent elements to execute their functions.

Each of the constituent elements included in each of the above-described devices may be integrated separately, or a part or all of them may be integrated into a single chip.

LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used.

Furthermore, when development of a semiconductor technology or another derived technology provides a circuit integration technology which replaces LSI, as a matter of course, functional blocks may be integrated by using this technology. Adaption of biotechnology, for example, is a possibility.

(3) A part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(4) The present disclosure may be the above-described methods. These methods may be a computer program executed by a computer, or digital signals forming the computer program.

The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray® Disc), and a semiconductor memory. The present disclosure may be the digital signals recorded on the recording medium.

The present disclosure may be implemented by transmitting the computer program or the digital signals via an electric communication line, a wired or wireless communication line, a network represented by the Internet, data broadcasting, and the like.

The present disclosure may be a computer system including a microprocessor and a memory. The memory stores the computer program and the microprocessor operates according to the computer program.

It is also possible that the program or the digital signals may be recorded onto the recording medium to be transferred, or may be transmitted via a network or the like, so that the program or the digital signals can be executed by a different independent computer system.

(5) The above-described embodiments and the above-described variations may be combined.

INDUSTRIAL APPLICABILITY

The present disclosure is applicable to a method, a server, and a program, and applicable to, for example, a method, a server, and a program that make it possible to collect data efficiently.

The invention claimed is:

1. A method comprising:
   associating one or more data managers with mutually different models of a plurality of devices, the one or more data managers managing data items generated by the plurality of devices;
   recording provision record information that includes data identification information and manager identification information that are associated with each other, the data identification information identifying each of one or more data items generated by the plurality of devices, the manager identification information identifying each of the one or more data managers; and
   determining an amount to be transferred to a data manager that manages, among the one or more data items, a used data item used by a data user, based on the provision record information,
   wherein the determining of the amount to be transferred to the data manager includes:
      identifying a data item associated with data identification information, based on the provision record information, the data identification information being identical to data identification information that identifies the used data item, and identifying a data manager that manages the data item identified; and
      determining an amount to be transferred to the data manger identified, based on value reference information of the data item identified,
   the method further comprises:
      recording the provision record information on a provision record database; and
      recording use record information on a use record database, the use record information including the data identification information that identifies the used data item,
   in the recording of the provision record information, a computer executes a consensus algorithm together with an other computer, and stores a first block that includes a first transaction data item into a distributed ledger held by the computer, the first transaction data item including the provision record information, and
   in the recording of the use record information, the computer executes the consensus algorithm together with the other computer, and stores a second block that includes a second transaction data item into the distributed ledger, the second transaction data item including the use record information.

2. The method according to claim 1,
   wherein the one or more data items are provided by one or more data providers having the plurality of devices, and
   the one or more data managers and the one or more data providers are mutually different.

3. The method according to claim 2,
   wherein a first data provider among the one or more data providers has a first device of a first model and a second device of a second model different from the first model,
   a second data provider among the one or more data providers has a third device of the first model and a fourth device of the second model,
   a first data manager among the one or more data managers manages data items provided by the first device and the third device, and
   a second data manager among the one or more data managers manages data items provided by the second device and the fourth device.

4. The method according to claim 1, further comprising:
   receiving a change request to change specific manager identification information associated with specific data identification information in the provision record information, the specific data identification information identifying a specific data item generated by a specific device; and
   changing the specific manager identification information associated with the specific data item, based on the change request.

5. The method according to claim 4,
   wherein the change request is a request to change first manager identification information to second manager identification information different from the first manager identification information, the first manager identification information being associated with first data identification information that identifies each of one or more first data items generated by a first device,
   in the changing, the first manager identification information associated with the first data identification information is changed to the second manager identification information, based on the change request,
   the first manager identification information is identification information that identifies a first data manager among the one or more data managers, and
   the second manager identification information is identification information that identifies a second data manager among the one or more data managers, the second data manager being different from the first data manager.

6. The method according to claim 1,
   wherein in the consensus algorithm in the recording of the provision record information, the computer transmits the first transaction data item that includes the provision record information to the other computer, and stores the first block that includes the first transaction data item into the distributed ledger held by the computer, and
   in the consensus algorithm in the recording of the use record information, the computer transmits the second transaction data item that includes the use record information to the other computer, and stores the second block that includes the second transaction data item into the distributed ledger.

7. The method according to claim 6,
   wherein each of a plurality of distributed ledgers held by the computer and the other computer includes a contract code for executing the identifying of the data manager and the determining of the amount to be transferred to the data manager identified, based on the second transaction data item, the plurality of distributed ledgers including the distributed ledger held by the computer, and
   the identifying of the data manager and the determining of the amount to be transferred to the data manager identified are executed by obtaining the second transaction data item and executing the contract code included in the distributed ledger held by the computer.

8. The method according to claim 6, wherein the provision record information further includes a hash value of the data item.

9. A server comprising:

a processor; and memory, wherein one or more data managers are different for each of models of a plurality of devices, the one or more data managers managing data items generated by the plurality of devices, using the memory, the processor:

records provision record information that includes data identification information and manager identification information that are associated with each other, the data identification information identifying each of one or more data items generated by the plurality of devices, the manager identification information identifying each of the one or more data managers; and determines an amount to be transferred to a data manager that manages, among the one or more data items, a used data item used by a data user, based on the provision record information, in determining of the amount to be transferred to the data manager, the processor:

identifies a data item associated with data identification information, based on the provision record information, the data identification information being identical to data identification information that identifies the used data item, and identifying a data manager that manages the data item identified; and determines an amount to be transferred to the data manger identified, based on value reference information of the data item identified, the processor further:

records the provision record information on a provision record database; and records use record information on a use record database, the use record information including the data identification information that identifies the used data item, in recording of the provision record information, a computer executes a consensus algorithm together with another computer, and stores a first block that includes a first transaction data item into a distributed ledger held by the computer, the first transaction data item including the provision record information, and in recording of the use record information, the computer executes the consensus algorithm together with the other computer, and stores a second block that includes a second transaction data item into the distributed ledger, the second transaction data item including the use record information.

10. A non-transitory computer-readable recording medium having recorded thereon a computer program for causing a computer to execute the method according to claim 1.

* * * * *